United States Patent
Fu et al.

(10) Patent No.: US 12,097,627 B2
(45) Date of Patent: Sep. 24, 2024

(54) CONTROL APPARATUS FOR ROBOTIC SYSTEM, CONTROL METHOD FOR ROBOTIC SYSTEM, COMPUTER-READABLE STORAGE MEDIUM STORING A COMPUTER CONTROL PROGRAM, AND ROBOTIC SYSTEM

(71) Applicant: OMRON Corporation, Kyoto (JP)

(72) Inventors: Xingdou Fu, Kyoto (JP); Lin Miao, Kyoto (JP); Yasuhiro Ohnishi, Kyoto (JP)

(73) Assignee: OMRON Corporation, Kyoto (JP)

( * ) Notice: Subject to any disclaimer, the term of this patent is extended or adjusted under 35 U.S.C. 154(b) by 307 days.

(21) Appl. No.: 17/788,772

(22) PCT Filed: Dec. 21, 2020

(86) PCT No.: PCT/JP2020/047594
§ 371 (c)(1),
(2) Date: Jun. 24, 2022

(87) PCT Pub. No.: WO2021/149429
PCT Pub. Date: Jul. 29, 2021

(65) Prior Publication Data
US 2023/0030852 A1 Feb. 2, 2023

(30) Foreign Application Priority Data

Jan. 23, 2020 (JP) .................................. 2020-009368
Jun. 17, 2020 (JP) .................................. 2020-104446

(51) Int. Cl.
*B25J 9/16* (2006.01)
(52) U.S. Cl.
CPC .................................. *B25J 9/1697* (2013.01)

(58) Field of Classification Search
CPC ..................... B25J 9/1697; G05B 2219/40613
See application file for complete search history.

(56) References Cited

U.S. PATENT DOCUMENTS

| 5,325,468 A | 6/1994 | Terasaki et al. |
| 10,977,480 B2 * | 4/2021 | Corcodel ............. G06V 10/255 |

(Continued)

FOREIGN PATENT DOCUMENTS

| CN | 106826812 A | 6/2017 |
| CN | 109249388 A | 1/2019 |

(Continued)

OTHER PUBLICATIONS

An English translation of the International Search Report ("ISR") of PCT/JP2020/047594 mailed on Mar. 9, 2021.

(Continued)

*Primary Examiner* — Kira Nguyen
(74) *Attorney, Agent, or Firm* — METROLEX IP LAW GROUP, PLLC; Robert L. Scott, Esq.

(57) ABSTRACT

A control apparatus according to one or more embodiments generates poses of the measurement device to measure an object, determines, for the measurement device, a measurement path including the poses to cause the measurement device to move along the measurement path including the poses and to measure the object, instructs the robot to move the measurement device along a movement path including the measurement path and instructs the measurement device to measure the object in the poses, recognizes the object (Continued)

using obtained measurement data, and determines the measurement path for the measurement device for a next operating cycle.

20 Claims, 11 Drawing Sheets

(56) References Cited

U.S. PATENT DOCUMENTS

| | | | |
|---|---|---|---|
| 2006/0269123 A1* | 11/2006 | Horita | G06T 7/579 |
| | | | 382/154 |
| 2014/0147240 A1 | 5/2014 | Noda et al. | |
| 2016/0093053 A1 | 3/2016 | Watanabe et al. | |
| 2017/0057092 A1 | 3/2017 | Ito | |
| 2017/0157767 A1 | 6/2017 | Takamizawa | |
| 2018/0290307 A1* | 10/2018 | Watanabe | G06T 7/97 |
| 2019/0015980 A1 | 1/2019 | Kojima et al. | |
| 2019/0143507 A1* | 5/2019 | Nishina | B25J 9/1669 |
| | | | 700/245 |
| 2019/0278991 A1* | 9/2019 | Hayashi | G06V 20/64 |
| 2019/0308320 A1 | 10/2019 | Konishi | |
| 2019/0381670 A1* | 12/2019 | Correll | B25J 15/10 |
| 2020/0094405 A1 | 3/2020 | Davidson et al. | |
| 2021/0039257 A1 | 2/2021 | Tonogai et al. | |
| 2021/0053217 A1 | 2/2021 | Davidson et al. | |

FOREIGN PATENT DOCUMENTS

| | | |
|---|---|---|
| CN | 110691676 A | 1/2020 |
| JP | H6-099381 A | 4/1994 |
| JP | 2016-070762 A | 5/2016 |
| JP | 2016-0099257 A | 5/2016 |
| JP | 2017-042859 A | 3/2017 |
| JP | 2018-176334 A | 11/2018 |
| JP | 2019-155535 A | 9/2019 |
| JP | 2019-185239 A | 10/2019 |
| WO | 2013/002099 A1 | 1/2013 |
| WO | 2019-138835 A1 | 7/2019 |

OTHER PUBLICATIONS

The Written Opinion("WO") of PCT/JP2020/047594 mailed on Mar. 9, 2021.

Chinese Office Action ("CNOA") issued on Jan. 10, 2024 in a counterpart Chinese patent application.

* cited by examiner

CONTROL APPARATUS FOR ROBOTIC SYSTEM, CONTROL METHOD FOR ROBOTIC SYSTEM, COMPUTER-READABLE STORAGE MEDIUM STORING A COMPUTER CONTROL PROGRAM, AND ROBOTIC SYSTEM

FIELD

The present disclosure relates to a control apparatus for a robotic system that manipulates an object, a control method for the robotic system, computer-readable storage medium storing a control program for the robotic system, and the robotic system.

BACKGROUND

A known system used for inspection or production lines in factory automation (FA) includes a robot (e.g., a piece-picking robot) that picks up randomly piled workpieces (e.g., parts) or other objects one by one from a container (e.g., a bin) for transfer to another place or into another container or for machining. Such a system performs, for example, three-dimensional (3D) measurement of randomly piled workpieces, compares the measurement results with 3D model data about the workpieces (3D matching) to recognize the 3D poses of the individual workpieces, and picks up the workpieces with the robot. An example of such a system described in Patent Literature 1 detects an object from each of two images captured while a robot is moving and obtains information about the pose of the robot for each captured image. This system obtains information about the gazes for the object in a robot coordinate system through calculation from positional information about the object and from the information about the pose of the robot for each image. The system detects the 3D position of the object based on the intersection of the gazes.

CITATION LIST

Patent Literature

Patent Literature 1: Japanese Unexamined Patent Application Publication No. 2016-70762

SUMMARY

Technical Problem

However, workpieces randomly piled in a container include workpieces typically with complex shapes that overlap one another and cause occlusion of the field of view partly or entirely at measurement or workpieces with mirror surfaces that may cause interreflection. In such cases, measurement data about the objects may be incomplete or missing. This may cause insufficient 3D matching and thus unsuccessful or inaccurate recognition of the objects. This may cause interruption in picking up objects when any workpiece remains in the container.

One or more embodiments may be directed to a control apparatus for a robotic system, a control method for the robotic system, a computer-readable storage medium storing a control program for the robotic system, and the robotic system that cause less interruption in, for example, picking up objects such as workpieces from a container and increase robustness in measuring objects and the work efficiency for manipulating objects.

An apparatus, a method, a computer-readable storage medium storing a program, and a system according to one or more embodiments may have the structures described below.

(1) A control apparatus according to one or more embodiments is a control apparatus for a robotic system. The robotic system includes a robot and a measurement device (sensor). The robot includes a robotic arm and a hand at an end of the robotic arm to manipulate an object. The measurement device (sensor) is located on the robotic arm to measure positional information (e.g., two- or three-dimensional positional information) about the object. The control apparatus includes a pose generator that generates one or more poses (orientations and coordinates) of the measurement device to measure the positional information about the object, a measurement path determiner that determines, for the measurement device, a measurement path including at least one pose of the one or more poses to cause the measurement device to move along the measurement path including the at least one pose and to measure the positional information about the object in the at least one pose, an instructor that instructs the robot to move the measurement device along a movement path including the measurement path, and to instruct the measurement device to measure the positional information about the object in the at least one pose included in the measurement path, and a recognizer that performs recognition of the object using measurement data obtained by the measurement device. The measurement path determiner determines the measurement path for the measurement device for a next operating cycle during, for example, (but not being limited to) movement of the measurement device along the movement path.

The operating cycle herein refers to the period in which the hand manipulating an object moves the object from a place to another place and/or the period in which the hand returns from the other place to the previous place. In other words, the operating cycle refers to the period in which the hand gripping an object moves and/or the period in which the hand moves to grip an object.

This structure defines, for the measurement device, the measurement path including one or more generated poses. The measurement device moves along the movement path including the measurement path. During the movement, objects are measured with the measurement device in the defined poses, and the measurement path for the next (or subsequent) operating cycle is determined. The poses of the measurement device and the measurement path including the poses may thus be defined based on (or to reflect), for example, information about randomly piled objects or the state of the measurement area including the objects. This may allow more reliable recognition of remaining objects than, for example, using a measurement device fixed relative to objects and measuring objects in the same field of view in every operating cycle. This structure may cause less interruption in, for example, picking up objects from the container, and thus increases robustness in measuring objects, the work efficiency for manipulating objects, and overall throughput.

(2) More specifically, in the above structure, the pose generator may pre-generate, based on a geometric positional relationship between the measurement device and a measurement area including the object, the one or more poses to fully cover the measurement area. The measurement path determiner may determine the measurement path including the one or more poses to cause the measurement device to move along the measurement path including the one or more poses in a predetermined order. In this structure, one or more fixed poses of the measurement device can be statically defined to fully cover the measurement area. Objects are measured on the measurement path including these poses. The measurement path may thus be defined to cover the measurement area reliably for the next (or subsequent) operating cycle as well. This may further increase robustness in measuring objects, the work efficiency for manipulating objects, and overall throughput.

(4) More specifically, in the above structure, the measurement result may include measurement data about the object obtained by the measurement device or a result of the recognition of the object.

(5) More specifically, the measurement data or the result of recognition may include at least one of the result of recognition of the object with lower reliability, point cloud data about the object being unsuccessfully recognized, missing data, a discrete shape, or data about the object at a higher position.

(6) In the above structure, the pose generator may select one or more specific poses from the one or more poses based on a predetermined condition or a predetermined measurement strategy or in a random manner. The measurement path determiner may determine, based on a predetermined condition or a predetermined measurement strategy or in a random manner, the measurement path including at least one pose of the one or more specific poses to cause the measurement device to move along the measurement path including the at least one pose of the one or more specific poses in a predetermined order. In this structure, the poses of the measurement device are statically defined to fully cover the measurement area. From these poses, specific poses that may allow more reliable recognition of objects may be selected for the next operating cycle based on, for example, the poses of recognized objects. The poses of the measurement device may thus be defined dynamically to define the measurement path for the next operating cycle. This may further increases increase robustness in measuring objects, measurement efficiency, the work efficiency for manipulating objects, and overall throughput.

(7) In the above structure, the pose generator may generate the one or more poses based on a predetermined condition or a predetermined measurement strategy or in a random manner. The measurement path determiner may determine, based on a predetermined condition or a predetermined measurement strategy or in a random manner, the measurement path including the at least one pose of the one or more poses to cause the measurement device to move along the measurement path including the at least one pose in a predetermined order. This structure objects may more dynamically define the poses of the measurement device that may allow more reliable recognition of objects for the next operating cycle based on, for example, the poses of recognized objects, without predefining fixed poses of the measurement device. The dynamically defined poses objects may be used to define the measurement path for the next operating cycle. This may further increase robustness in measuring objects, measurement efficiency, the work efficiency for manipulating objects, and overall throughput.

(8) More specifically, in the above structure, the predetermined condition may include at least one of measurement data about the object (e.g., point cloud data about recognized objects or range images) in a previous operating cycle, a result of the recognition of the object (e.g., the number, placement, or poses of recognized objects) in a previous operating cycle, or the structure of the robotic system (e.g., the geometric positional relationship between the field of view of the measurement device, the measurement area, and the area in which objects are positioned). In this structure, the predetermined condition is used as a reference or an index for dynamically generating or selecting the poses of the measurement device. This may allow the poses and the measurement path to be defined more effectively.

(9) In the above structure, the predetermined measurement strategy may be based on at least one of a coverage of the measurement area (to cover a wider measurement area), easiness of the recognition of the object (to allow easier recognition of the object), efficiency of the measurement path (to define, for example, the shortest measurement path), reliability of the recognition of the object (for an object recognized unsuccessfully or less reliably), or the position of the object (representing the easiness of gripping of randomly piled objects). In this structure, the poses of the measurement device can be dynamically generated or selected under the condition satisfying the predetermined measurement strategy. This may allow the poses and the measurement path to be defined more effectively based on, for example, the changing state of randomly piled objects.

(10) In the above structure, the instructor may instruct the robot and the measurement device to measure the positional information about the object in the one or more poses in movement of the hand gripping the object and/or in movement of the hand to grip the object. This structure may allow objects to be measured both when the hand grips an object to transfer the object to another place (picks up an object and then leaves) and when the hand releases an object and returns to the previous place (approaches an object to pick up the object). This may allow the measurement path to be defined more flexibly and in more versatile situations for the next (or subsequent) operating cycle.

(11) A control method according to one or more embodiments is a control method for a robotic system. The robotic system includes a robot and a measurement device. The robot includes a robotic arm and a hand at an end of the robotic arm to manipulate an object. The measurement device is located on the robotic arm to measure positional information about the object.

More specifically, the method includes generating, with a pose generator, one or more poses of the measurement device to measure the positional information about the object, determining, with a measurement path determiner, for the measurement device, a measurement path including the one or more poses to cause the measurement device to move along the measurement path including the one or more poses and to measure the positional information about the object in the one or more poses, instructing, with an instructor, the robot to move the measurement device along a movement path including the measurement path, and instructing the measurement device to measure the positional information about the object in at least one pose of the one or more poses included in the measurement path, performing, with a recognizer, recognition of the object using measurement data obtained by the measurement device, and determining, with the measurement path determiner, the measurement path for the measurement device for a next operating cycle during movement of the measurement device along the movement path.

(12) A computer-readable storage medium storing a computer control program according to one or more embodiments is a computer-readable storage medium storing a program for causing a computer to effectively function as the control apparatus according to one or more embodiments.

(13) A robotic system according to one or more embodiments includes a robot including a robotic arm and a hand at an end of the robotic arm to manipulate an object, a measurement device located on the robotic arm to measure positional information about the object, and the control apparatus according to one or more embodiments.

The term a unit or a device as used herein do not merely refer to a physical component, but also to the function of the unit or device implemented by software. The function of a single unit or device may be implemented by two or more physical components or devices, or the functions of two or more units or devices may be implemented by a single physical component or device. The unit or device can also refer to, for example, means or a system.

The structures according to one or more embodiments may invention cause less interruption in, for example, picking up objects from the container, and thus may increase robustness in measuring objects, the work efficiency for manipulating objects, and overall throughput. Such efficient processing may increase the processing speed of the entire system, may save the storage space, and may reduce the amount of data for communication with higher reliability of processing.

DETAILED DESCRIPTION

Figure 1A:
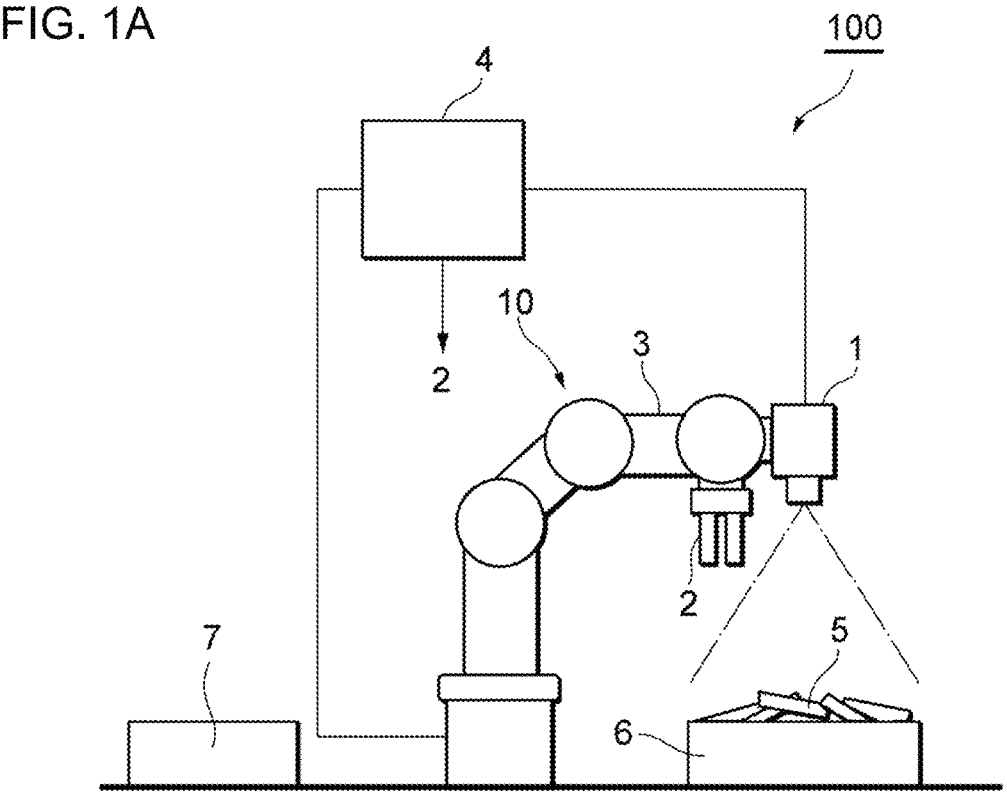
FIGS. 1A and 1B are schematic diagrams illustrating side views of a robotic system including a control apparatus according to one or more embodiments in one situation.

An embodiment of the present disclosure (hereafter, the present embodiment) will now be described with reference to the drawings. The embodiment below is an example without excluding various modifications and techniques that are not explicitly described below. In other words, the embodiment of the present disclosure may be variously modified for implementation without departing from the spirit and scope of the disclosure. The same or similar reference signs denote the same or similar components in the drawings. The drawings are schematic and are not drawn to scale relative to the actual size of each component. The components may have different relative scales in different drawings.

1. Example Use

Figure 1B:
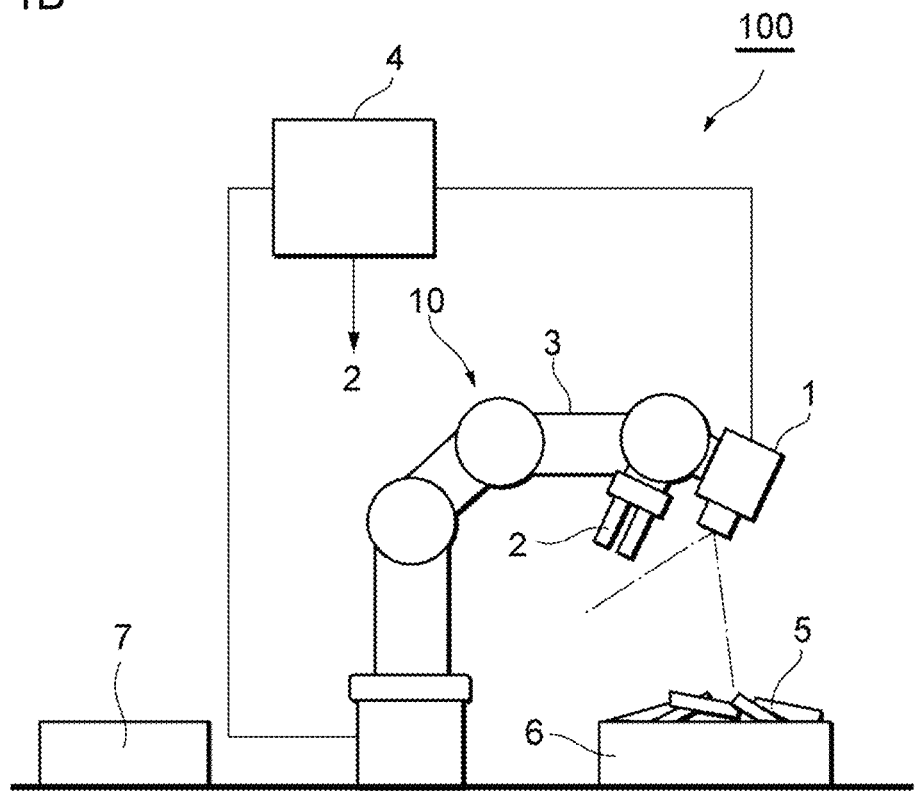
Figure 2:
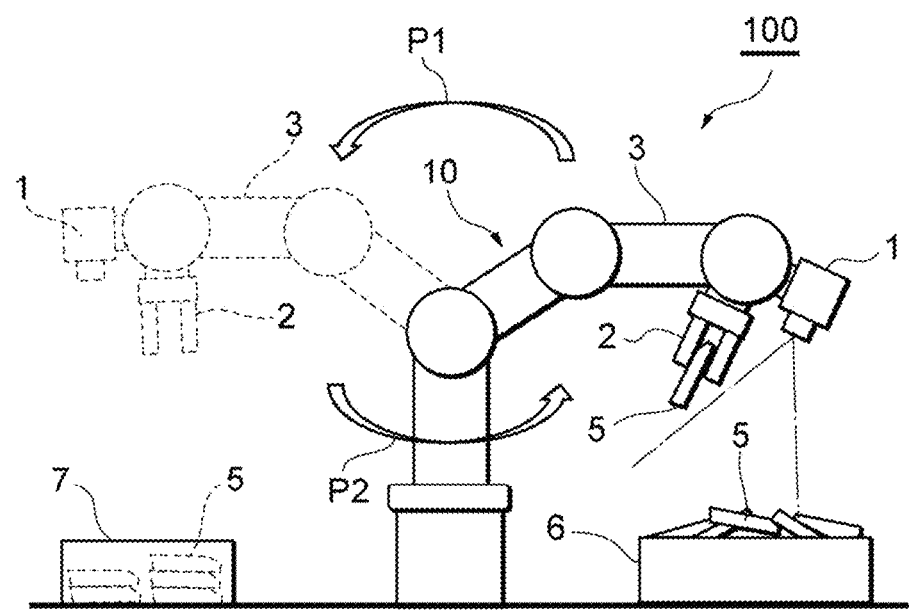
FIG. 2 is a schematic diagram illustrating a side view of a robotic system including a control apparatus according to one or more embodiments in one situation.

An example use of the present disclosure will now be described with reference to FIGS. 1A, 1B, and 2. FIGS. 1A, 1B, and 2 are each a schematic side view of a robotic system including a control apparatus according to the present embodiment in one situation. The robotic system 100 according to the present embodiment can perform the operation of picking up randomly piled workpieces 5 from a container (e.g., a bin) 6 and transferring and placing the workpieces 5 into, for example, another container 7 in an aligned manner with a robot 10 (refer to a movement path P1 in FIG. 2), and/or the operation of returning the robot 10 that has transferred a workpiece 5 to the container 6 to pick up the next workpiece 5 (refer to a movement path P2 in FIG. 2). Examples of the workpieces 5 include, but are not limited to, machine components of an automobile powertrain system (e.g., an engine or a transmission) or electronic components of an electrical system. The robotic system 100 includes, in addition to the robot 10, a sensor 1 (an example of a measurement device in one or more aspects of the present disclosure) located on the robot 10, and a control apparatus 4 connected to the sensor 1 and the robot 10.

The sensor 1 is a 3D sensor that obtains measurement data including positional information (e.g., 3D positional information) about the workpieces 5. As shown in FIGS. 1A and 1B, the sensor 1 is attached to the end of a robotic arm 3 of the robot 10 to capture images of the workpieces 5 in a predetermined field of view (viewing angle) under predetermined measurement conditions. The sensor 1 may be, for example, a range sensor that measures a point cloud, or a range image sensor combining a range sensor and a two-dimensional (2D) sensor to obtain range images. The range sensor measures a distance d as depth information. The 2D sensor is an image sensor that captures 2D images. Unlike range images, 2D images have their pixel values indicating information other than distances d. The range image sensor may be, for example, a camera that captures multiple 2D images of the workpieces 5 with the 2D sensor at different positions and obtains a range image having its pixel values indicating distances d by stereoscopic image processing. In some embodiments, the range image sensor may be a stereo camera that captures the workpieces 5 in different directions at the same time to obtain a range image with its pixel values indicating distances d.

The sensor 1 may optionally include a projector (not shown) that projects, onto the workpieces 5, 3D light including appropriate measurement light (e.g., patterned light or scanning light usable for active methods) or typical 2D light. The projector may have any structure. A projector that projects patterned light, for example, may include a laser source, a patterned mask, and a lens. Light emitted from the laser source is converted into measurement light with a predetermined pattern (patterned light) through the patterned mask with a predetermined pattern and is projected onto the workpieces 5 through the lens.

The predetermined pattern may be any pattern usable with, for example, active one-shot methods. More specifically, for example, the pattern may be a linear pattern with multiple lines that are arranged two-dimensionally at predetermined intervals, an area pattern with multiple types of unit images, unit shapes, geometric shapes, or other structures that are distinguishable from each other and two-dimensionally arranged (regularly or randomly, or with regular and random portions mixed or superimposed), or a grid graph pattern with graphic symbols located on a grid of vertical and horizontal lines. Each predetermined pattern may include identification (ID) information for identifying, for example, lines or unit shapes for encoding.

The workpieces 5 may be measured with any method selected as appropriate from, for example, various active measurement methods using the straightness of light (e.g., spatially encoded pattern projection based on triangulation, temporally encoded pattern projection, or moire topography methods), various passive measurement methods using the straightness of light (e.g., stereo camera methods based on triangulation, visual hull methods, factorization methods, or depth from focus methods based on coaxial range finding), and various active measurement methods using the speed of light (e.g., time of flight based on simultaneous range finding or laser scanning).

The measurement data about the workpieces 5 may be, for example, image data (e.g., 3D point cloud data or range images) obtained with the various measurement methods above, or other appropriate data that can be compared with 3D model data about the workpieces 5. The 3D model data about the workpieces 5 may be, for example, 3D coordinate data, 2D coordinate data resulting from 2D projection of the 3D coordinate data for each of different poses of each workpiece 5, or other data for appropriate templates or patterns. The comparison with 3D model data is optional for recognizing the workpieces 5. The workpieces 5 may be recognized without using model data (model-less recognition).

The robot 10 is, for example, an articulated robot (e.g., a vertical articulated robot or a horizontal articulated robot) including a hand 2 for manipulating (e.g., gripping, sucking, moving, assembling, or inserting) the workpieces 5 and the robotic arm 3 including the hand 2 at the end. The robot 10 has joints each incorporating a drive such as a servo motor for driving the joint and a displacement detector such as an encoder for detecting the displacement (angular displacement) of the joint. The robot 10 operates as an autonomous manipulator and has various uses in, for example, picking, assembling, conveying, painting, inspecting, polishing, or cleaning the workpieces 5.

The hand 2 is an example end-effector and includes a gripper that can grip and release (grasp and drop) the individual workpieces 5. The robotic arm 3 includes a driver for moving the hand 2 to a grip position (pickup position) in the container 6 and moving the hand 2 gripping the workpiece 5 from the grip position to a release position (drop position) in the other container 7.

The control apparatus 4 is connected to the sensor 1 and the robot 10. The control apparatus 4 controls the measurement of the workpieces 5 with the sensor 1, the manipulation of the workpieces 5 with the hand 2, the driving of the robot 10 (such as the hand 2 or the robotic arm 3), and other processes for various operations and computations to be performed in the robotic system 100. More specifically, for example, the control apparatus 4 performs the processes described below.

(1) Generating Sensor Poses

The poses of the sensor 1 to perform 3D measurement of the workpieces 5 (specifically, all the workpieces 5 in the container 6; the same applies hereafter) are generated. The poses of the sensor 1 may be generated by, for example, statically defining one or more fixed poses (the orientations and 3D coordinates of the sensor 1) to fully cover a measurement area including the workpieces 5 (e.g., the inside of the container 6 of the workpieces 5) based on the geometric positional relationship between the sensor 1 and the measurement area. The poses of the sensor 1 may also be defined dynamically by selecting specific poses from the fixed poses based on a predetermined condition or a predetermined measurement strategy or in a random manner, or by using positional information about the workpieces 5 previously obtained. A single 3D measurement typically produces recognition results (positional information) for multiple workpieces 5. For a workpiece 5 to be picked up from the container 6, the measurement area includes the inside of the container 6 (or in other words, the area with the workpieces 5). For a workpiece 5 to be placed into the container 7, the measurement area includes the inside of the container 7 (or in other words, the area in which the workpiece 5 is to be placed). For a workpiece 5 to be gripped and moved from the inside of the container 6 to the inside of the container 7, the measurement area includes the inside of the container 6 and the inside of the container 7.

(2) Determining Measurement Path for Sensor (First Operating Cycle)

A measurement path is determined for the sensor 1 to move along the measurement path including the generated poses to perform 3D measurement of the workpieces 5 in each pose. For example, the measurement path may be determined to cause the sensor 1 to be in all the statically defined poses. In some embodiments, the measurement path may be determined to cause the sensor 1 to be in at least one of the specific poses selected from the statically defined poses based on a predetermined condition or a predetermined measurement strategy or in a random manner, or to be in at least one of dynamically defined poses. In this example, the movement path P1 or the measurement path P2, or both (hereafter, simply the movement paths P1 and P2) are further determined. The movement path P1 refers to a path including the determined measurement path and traveled by the hand 2 when the hand 2 grips and transfers a grip target workpiece 5 from the container 6 to the other container 7. The movement path P2 refers to a path including the determined measurement path and traveled by the hand 2 when the hand 2 returns to the container 6.

(3) Gripping, Moving, and Releasing Workpiece

A grip target workpiece 5 is gripped and picked up from the multiple (all) workpieces 5 randomly piled in the container 6, moved from the container 6 to the other container 7 along the defined movement path P1, and released and dropped at a target position. The hand 2 that has released the workpiece 5 is then moved to the container 6 along the defined movement path P2. A series of these movements is defined as an operating cycle (gripping, moving, and releasing a workpiece 5) and is repeated for the next (or subsequent) operating cycle. A single operating cycle may include the movement path P1 or P2, or both as in the present embodiment.

(4) 3D Measurement of Workpieces

During (3) gripping, moving, and releasing a workpiece, the sensor 1 performs 3D measurement of the workpieces 5 in the poses defined in the measurement path. For a workpiece 5 to be picked up from the container 6, for example, the sensor 1 performs 3D measurement of the workpieces 5 in the container 6 in the poses defined in the measurement path. The 3D measurement of the workpieces 5 in the container 6 is intended to recognize the status of the pile of workpieces 5 in the container 6 and their poses to determine the workpiece 5 to be picked up from the container 6. For a workpiece 5 to be placed into the container 7, for example, the sensor 1 performs 3D measurement of the workpieces in the container 7 in the poses defined in the measurement path. The 3D measurement of the workpieces 5 in the container 7 is intended to recognize the status of the pile of workpieces 5 in the container 7 and their poses to determine the area (position) in or at which a workpiece 5 is to be placed in a vacant area (or in other words, an area with no workpiece 5) in the container 7. The 3D measurement of the workpieces 5 may be performed while the hand 2 gripping a workpiece 5 is moving away from the container 6 toward the other container 7, or while the hand 2 is moving from the other container 7 closer to the container 6 after releasing a workpiece 5.

(5) Recognizing Workpiece Poses

At an appropriate time before or after (4) 3D measurement of workpieces, 3D model data (3D computer-aided design or CAD model data) representing the 3D shape of each workpiece 5 is obtained, or templates or model patterns are created as appropriate to be used for recognizing the poses of the workpieces 5. During (3) gripping, moving, and releasing a workpiece, 3D matching is performed. In the 3D matching, measurement data about the multiple workpieces 5 obtained by the sensor 1 is compared with, for example, 3D model data using predetermined recognition parameters to recognize the pose of each workpiece 5 (e.g., the 3D coordinates and the rotational angle about the 3D axis of the workpiece 5). For example, the result of pose recognition for each workpiece 5 may be output as a 2D image resulting from 2D projection of the workpiece 5 in a recognized pose with an identifiably displayed contour (or a line segment corresponding to the edge) detected with 3D matching as feature points or a feature portion of the workpiece 5. As described above, the comparison with 3D model data is optional for recognizing the workpieces 5. The workpieces 5 may be recognized without using model data (model-less recognition). For a workpiece 5 to be picked up from the container 6, the workpiece 5 is determined based on the results of pose recognition for the workpieces 5 in the container 6. For a workpiece 5 to be placed into the container 7, for example, a vacant area (or in other words, an area with no workpiece 5) in the container 7 is determined based on the results of pose recognition for the workpieces 5 in the container 7. The area (position) in or at which a workpiece 5 is to be placed in the vacant area in the container 7 is determined to avoid interference with the workpieces 5 in the container 7.

(6) Determining Next Workpiece to Be Gripped and Next Position at Which Workpiece Is to Be Placed For a workpiece 5 to be picked up from the container 6, for example, the reliability (accuracy) of the recognition result is evaluated with an appropriate method for each workpiece 5 based on the result of pose recognition for the workpiece 5 during (3) gripping, moving, and releasing a workpiece. Based on the evaluation results, for example, workpieces 5 with higher reliability than a predetermined threshold are selected as candidate workpieces 5 to be gripped next by the hand 2. The reliability may be evaluated by, for example, extracting the feature quantity of the 3D shape of each workpiece 5 from the result of pose recognition for the workpiece 5 and calculating an index indicating the degree of agreement with or similarity to 3D model data based on the extracted feature quantity. For each candidate workpiece 5 to be gripped, the pose of the hand 2 for gripping the workpiece 5 is calculated using predetermined calculation parameters based on the result of pose recognition for the workpiece 5. For example, workpieces 5 are selected in a random manner or as appropriate from the workpieces 5 grippable with the hand 2. Each selected workpiece 5 may be evaluated for the easiness of gripping with the hand 2 (easiness of grip). Based on the evaluation results, the workpiece 5 to be gripped in the next operating cycle is determined. The reliability of the recognition result and the easiness of grip may not correspond to (agree with) each other. For example, a workpiece 5 that shows lower reliability may be easier to grip (more easily grippable) than a workpiece 5 that shows higher reliability. For workpieces 5 to be placed into the container 7, for example, the areas (or positions) in the container 7 in or at which the workpieces 5 are to be placed and the order of placement may be predetermined as a default placement rule. A workpiece 5 may not interfere with the workpieces 5 in the container 7 when placed in a vacant area in the container 7 in accordance with the default placement rule. In this case, the workpiece 5 may be placed in the vacant area in the container 7 in accordance with the default placement rule. A workpiece 5 may interfere with the workpieces 5 in the container 7 when placed in a vacant area in the container 7 in accordance with the default placement rule. In this case, the workpiece 5 may be placed in an area (position) different from the area (position) defined by the default placement rule to avoid interference with the workpieces 5 in the container 7. In this manner, the target position of the workpiece 5 to be placed into the container 7 by the hand 2 is determined based on the positional information about the workpieces 5 in the container 7.

(7) Determining Measurement Path for Sensor (Next Operating Cycle)

During (3) gripping, moving, and releasing a workpiece, the measurement path for the sensor 1 and the movement path including the measurement path are defined for the next (or subsequent) operating cycle based on the poses of the sensor 1 defined in (1) generating sensor poses. These paths are defined to also reflect the position of the workpiece 5 to be gripped from the container 6 and/or the target position of the workpiece 5 to be placed into the container 7 in the next operating cycle. The measurement path may be the same as or different from the previous measurement path.

As described above, the sensor 1, the hand 2, the robotic arm 3, the control apparatus 4, the robot 10, and the robotic system 100 correspond to examples of a sensor, a hand, a robotic arm, a control apparatus, a robot, and a robotic system in one or more aspects of the present invention. The workpiece 5 corresponds to an example of an object in one or more aspects of the present invention. The control apparatus 4 corresponds to an example of each of a pose generator, a measurement path determiner, an instructor, and a recognizer in one or more aspects of the present invention.

As described above, the control apparatus 4 and the robotic system 100 including the control apparatus 4 according to the present embodiment define, for the sensor 1, the measurement path including one or more generated poses. The sensor 1 moves along either or both the movement paths P1 and P2 including the measurement path. During the movement, the sensor 1 performs 3D measurement of the workpieces 5 in the defined poses, and the measurement path is determined for the next (or subsequent) operating cycle. The poses of the sensor 1 and the measurement path including the poses can thus be defined based on (or to reflect), for example, information about the randomly piled workpieces 5 or the state of the measurement area including the workpieces 5. This allows more reliable recognition of workpieces 5 remaining in the container 6 than, for example, using a sensor 1 fixed relative to the workpieces 5 and measuring the workpieces 5 in the same field of view in every operating cycle. This causes less interruption in, for example, picking up the workpieces 5 from the container 6, and thus increases robustness in measuring the workpieces 5, the work efficiency for manipulating the workpieces 5, and overall throughput.

2. Example Structure

Hardware Configuration

Figure 3:
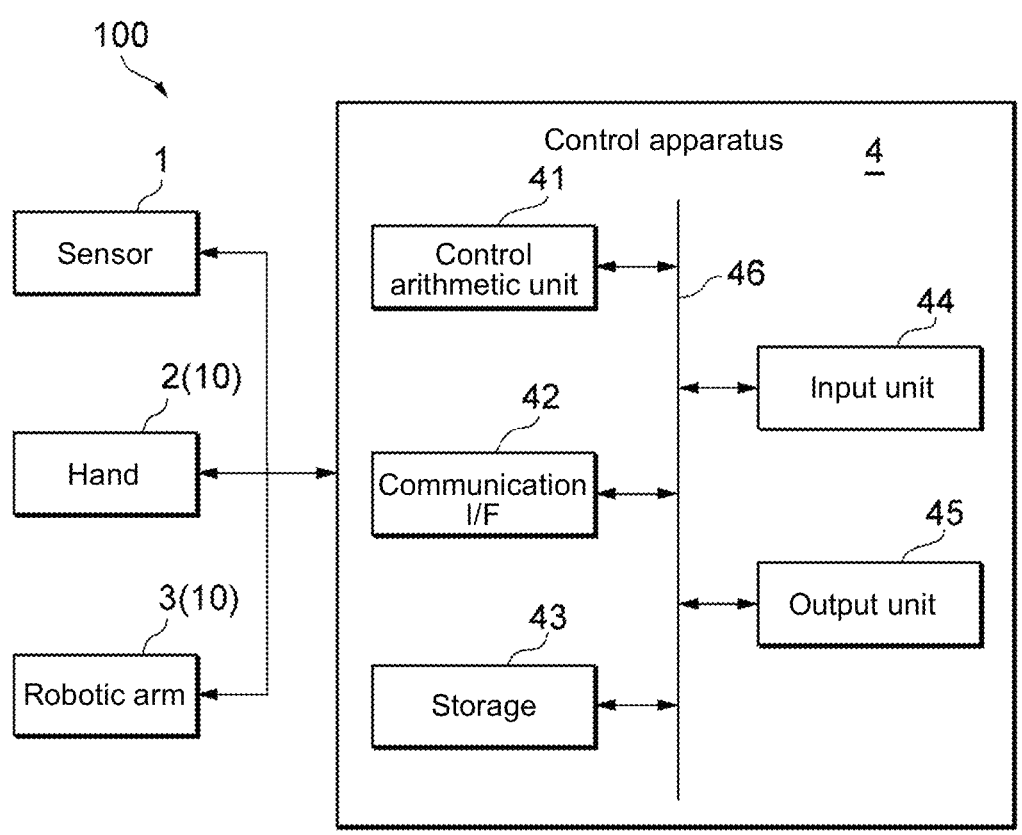
FIG. 3 is a schematic block diagram illustrating a robotic system including a control apparatus according to one or more embodiments showing an example hardware configuration.

The hardware configuration of the robotic system 100 according to the present embodiment will now be described with reference to FIG. 3. FIG. 3 is a schematic block diagram of the robotic system 100 including the control apparatus 4 according to the present embodiment, showing its example hardware configuration. In the example of FIG. 3 as well, the robotic system 100 includes the sensor 1, the robot 10 including the hand 2 and the robotic arm 3, and the control apparatus 4 illustrated in FIGS. 1A, 1B, and 2. The control apparatus 4 includes a control arithmetic unit 41, a communication interface (I/F) 42, a storage 43, an input unit 44, and an output unit 45. These units are connected to communicate with one another with a bus line 46.

The control arithmetic unit 41 includes, for example, a central processing unit (CPU), a random-access memory (RAM), and a read-only memory (ROM). The control arithmetic unit 41 performs control and various arithmetic operations for each component in accordance with intended information processing.

The communication I/F 42 is, for example, a communication module for communicating with other components (units or devices) with wires or wirelessly. The communication I/F 42 may use any communication scheme, such as a local area network (LAN) or a universal serial bus (USB). An appropriate communication line equivalent to the bus line 46 may be used. The sensor 1, the hand 2, and the robotic arm 3 can communicate with, for example, the control arithmetic unit 41 with the communication I/F 42.

The storage 43 is an auxiliary storage, such as a hard disk drive (HDD) or a solid-state drive (SSD). The storage 43 stores various programs executable by the control arithmetic unit 41, such as arithmetic programs for performing various processes including the processes in (1) to (7) above, and control programs for controlling the operations of the sensor 1, the hand 2, and the robotic arm 3. The storage 43 also stores a database containing measurement data output from the sensor 1, measurement conditions, recognition parameters, and various calculation parameters. The storage 43 also stores data about the results of various arithmetic operations and calculations, data about the results of pose recognition for multiple workpieces 5, data about the picking statuses and picking records for the workpieces 5, 3D model data for the workpieces 5, data about the measurement area that can include multiple workpieces 5, and data for defining the poses of the sensor 1 for measuring the measurement area. The arithmetic programs and the control programs stored in the storage 43 are thus executed by the control arithmetic unit 41 to perform various processing functions in the example functional components described later.

The input unit 44 is an interface device for receiving various input operations from a user of the robotic system 100. The input unit 44 may be implemented as, for example, a mouse, a keyboard, a touchscreen, or a microphone. The output unit 45 is an interface device for providing, for example, the user of the robotic system 100 with various items of information with a display, voice outputs, or printed outputs. The output unit 45 may be implemented as, for example, a display, a speaker, or a printer.

Functional Components

Figure 4:
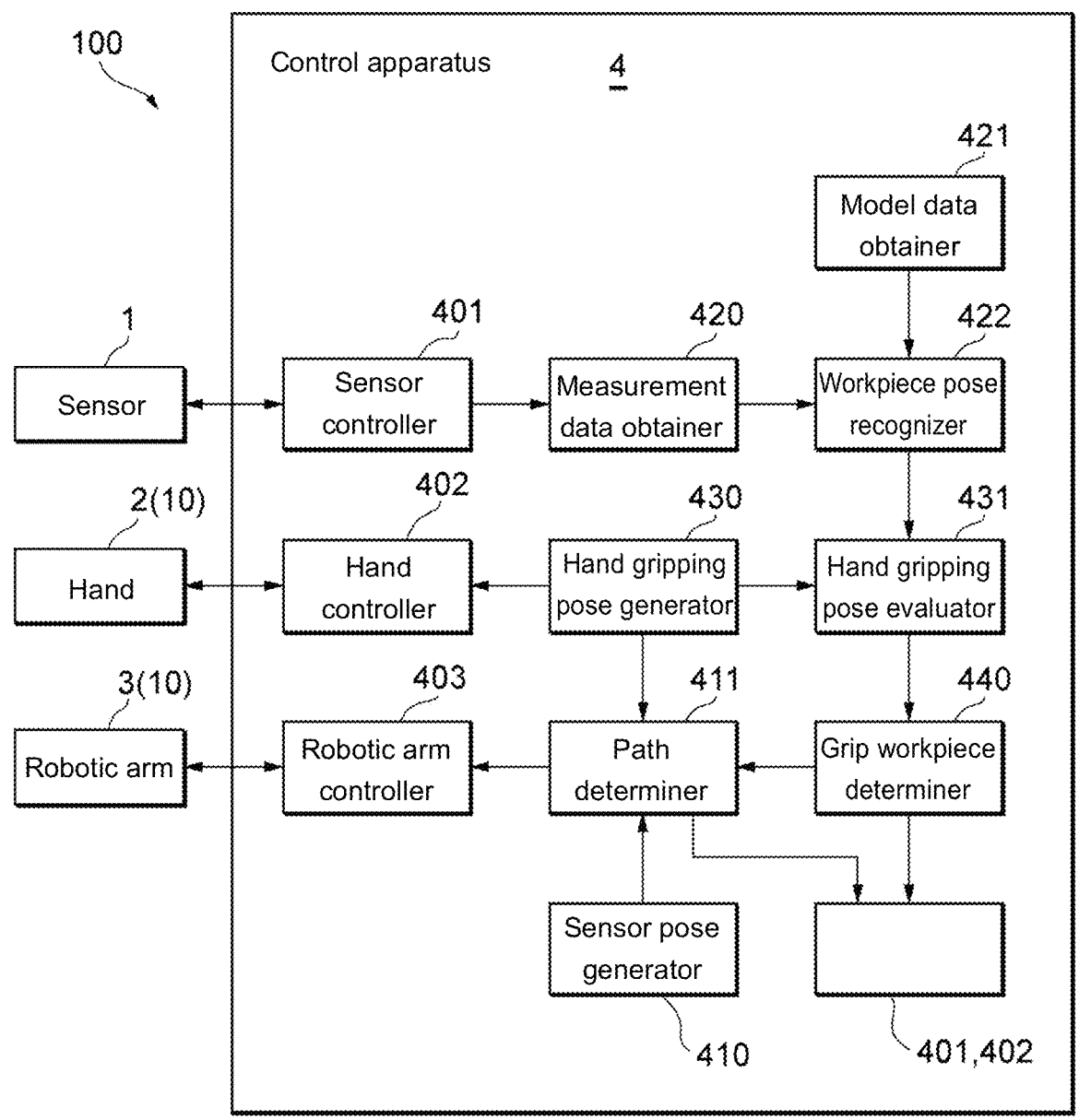
FIG. 4 is a schematic block diagram illustrating a robotic system including a control apparatus according to one or more embodiments, showing example functional components.

The functional components of the robotic system 100 including the control apparatus according to the present embodiment will now be described with reference to FIG. 4. FIG. 4 is a schematic block diagram of the robotic system 100 including the control apparatus 4 according to the present embodiment, showing its example functional components.

The control arithmetic unit 41 in the robotic system 100 shown in FIG. 4 loads various programs (e.g., control programs and arithmetic programs) stored in the storage 43 into the RAM. The CPU in the control arithmetic unit 41 interprets and executes the various programs loaded in the RAM to control each component. As illustrated in FIG. 3, the robotic system 100 according to the present embodiment may include, as functional units that can perform the processes described in the above (1) to (7), a sensor controller 401, a hand controller 402, a robotic arm controller 403, a sensor pose generator 410, a path determiner 411, a measurement data obtainer 420, a model data obtainer 421, a workpiece pose recognizer 422, a hand gripping pose generator 430, a hand gripping pose evaluator 431, and a grip workpiece determiner 440.

In the present embodiment, the functions of the control apparatus 4 in the robotic system 100 are implemented by a general-purpose CPU. However, the functions may be partly or entirely implemented by one or more dedicated processors. The functional components of the control apparatus 4 in the robotic system 100 may be eliminated, substituted, or added as appropriate in each embodiment or example. The control apparatus may be a typical information processor (e.g., a computer or a workstation).

3. Operation Example

Figure 5:
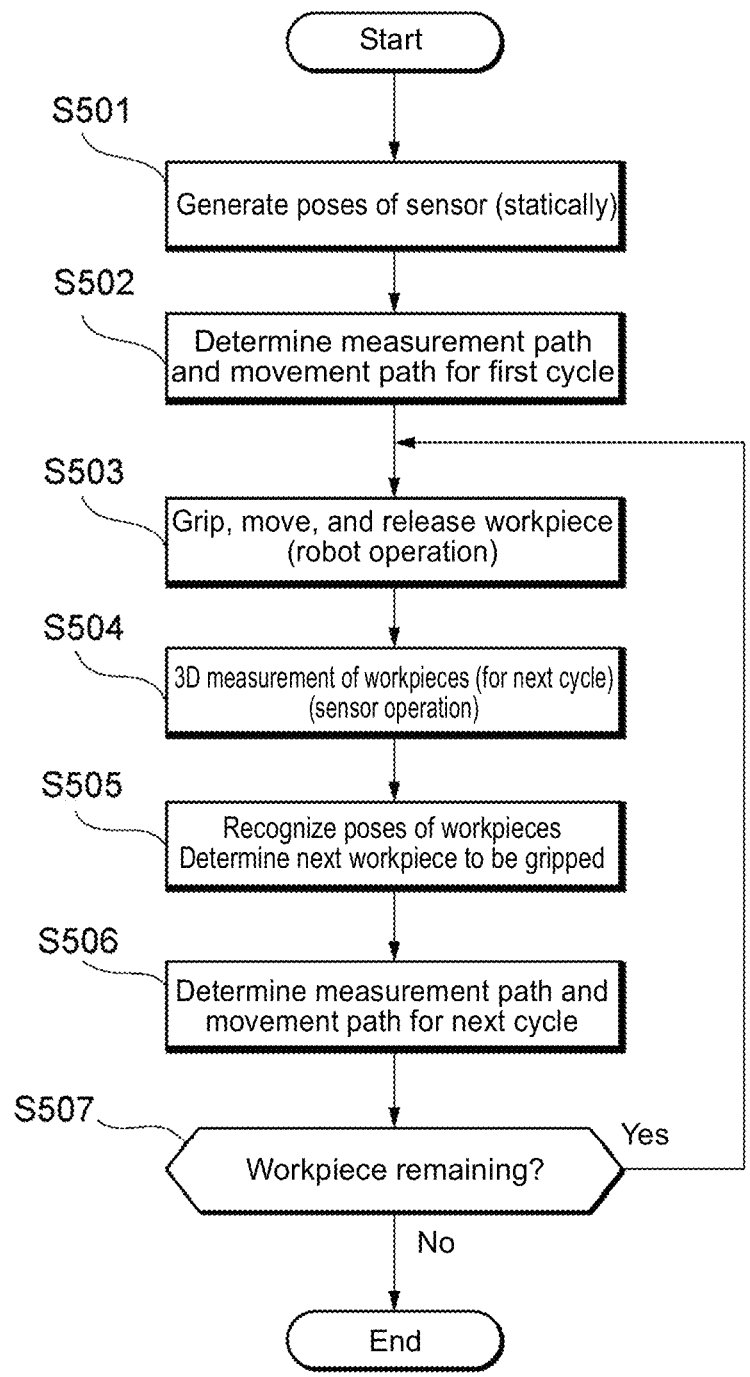
FIG. 5 is a flowchart illustrating an example procedure performed in a robotic system including the control apparatus according to one or more embodiments.

An operation example of the robotic system 100 will now be described with reference to FIG. 5. FIG. 5 is a flowchart showing an example procedure performed in the robotic system 100 including the control apparatus 4 according to the present embodiment, and is also an example procedure with a control method for the robotic system 100. The procedure described below is a mere example, and the steps in the procedure may be changed as appropriate within the scope of the technical idea of the present disclosure. In the procedure described below, steps may be eliminated, substituted, or added as appropriate in each embodiment or example.

Activation

First, the user of the robotic system 100 activates the robotic system 100 and causes the robotic system 100 to execute various programs (e.g., arithmetic programs and control programs). The control arithmetic unit 41 in the control apparatus 4 controls the operations of the sensor 1, the hand 2, and the robotic arm 3 in accordance with the procedure below, and performs arithmetic processing with the functional units in the control apparatus 4. In the present embodiment, a set of defaults for measurement conditions, recognition parameters, and various calculation parameters to be used in individual steps is read from the storage 43 before the processes of the corresponding steps below. The set of defaults is then stored as appropriate in the sensor controller 401, the sensor pose generator 410, the path determiner 411, the workpiece pose recognizer 422, the hand gripping pose generator 430, and the hand gripping pose evaluator 431. The measurement conditions and the various parameters can be read at any appropriate time before the processes of the corresponding steps.

Step S501

In step S501, the sensor pose generator 410 generates poses of the sensor 1 (orientations and 3D coordinates of the sensor 1) in which the sensor 1 is to perform 3D measurement of the workpieces 5. In this example, one or more fixed poses of the sensor 1 are statically defined to fully cover the measurement area including the multiple workpieces 5 (e.g., the inside of the container 6 of the multiple workpieces 5) based on the geometric positional relationship between the sensor 1 and the measurement area. Step S501 thus corresponds to (1) generating sensor poses in the above example use.

In some embodiments, one or more fixed poses of the sensor 1 may be statically defined to fully cover the measurement area based on, for example, measurement results obtained by the sensor 1 in an operating cycle being at least one cycle preceding a current operating cycle, rather than based on the geometric positional relationship between the sensor 1 and the measurement area. In this case, the measurement results may include measurement data about the multiple workpieces 5 obtained by the sensor 1 or recognition results of the workpieces 5. More specifically, the measurement results may include at least one of a recognition result of a workpiece 5 with lower reliability among the multiple workpieces 5, point cloud data about a workpiece 5 being unsuccessfully recognized, missing data about a workpiece 5, a discrete shape between workpieces 5, or data about a workpiece 5 at a higher position among the randomly piled workpieces 5.

Figure 6:
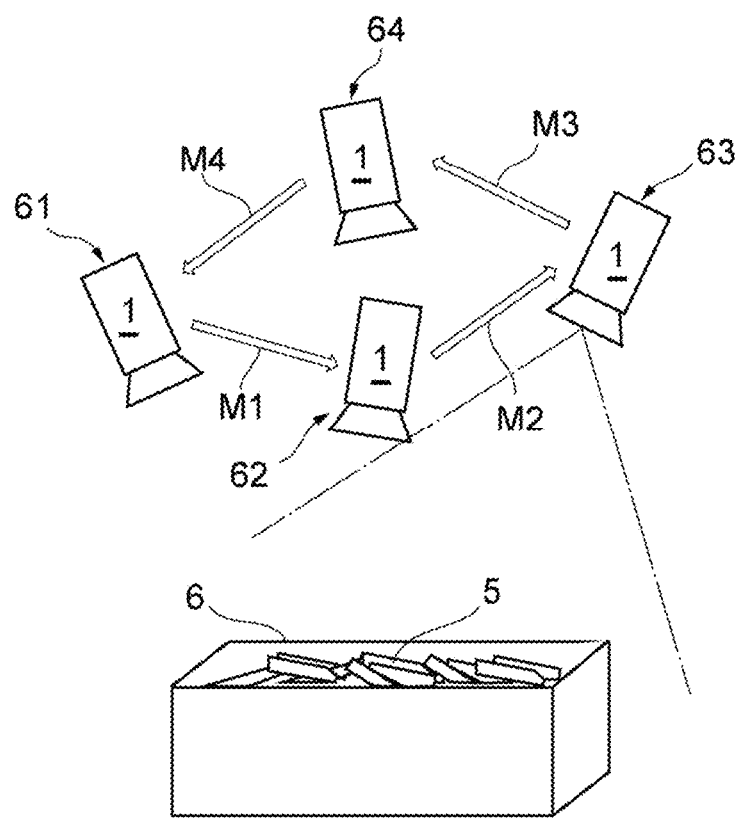
FIG. 6 is a schematic diagram illustrating a perspective view of a measurement device (sensor) in one or more embodiments, showing example poses and an example measurement path for the measurement device.

FIG. 6 is a schematic perspective view of the sensor 1 in the present embodiment, showing example poses and an example measurement path for the sensor 1. In this example, different (four in the drawing) poses 61 to 64 are generated for the sensor 1 having a field of view as large as or larger than the measurement area that can include the multiple workpieces 5 (e.g., the inside of the container 6). As illustrated, the measurement area including the workpieces 5 can be measured from up to four positions with different orientations and 3D coordinates.

Figure 7A:
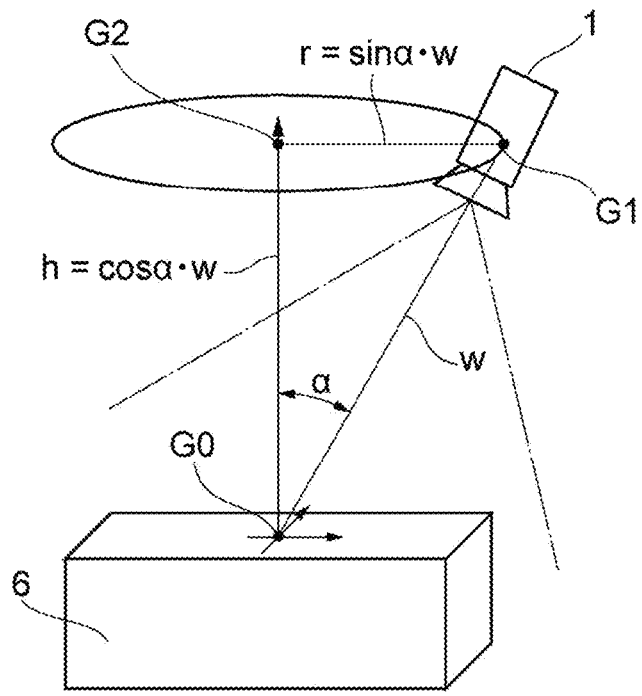
FIG. 7A is a schematic diagram illustrating a perspective view conceptually showing an example method for defining 3D coordinates of a sensor in poses, such as are shown in FIG. 6.
Figure 7B:
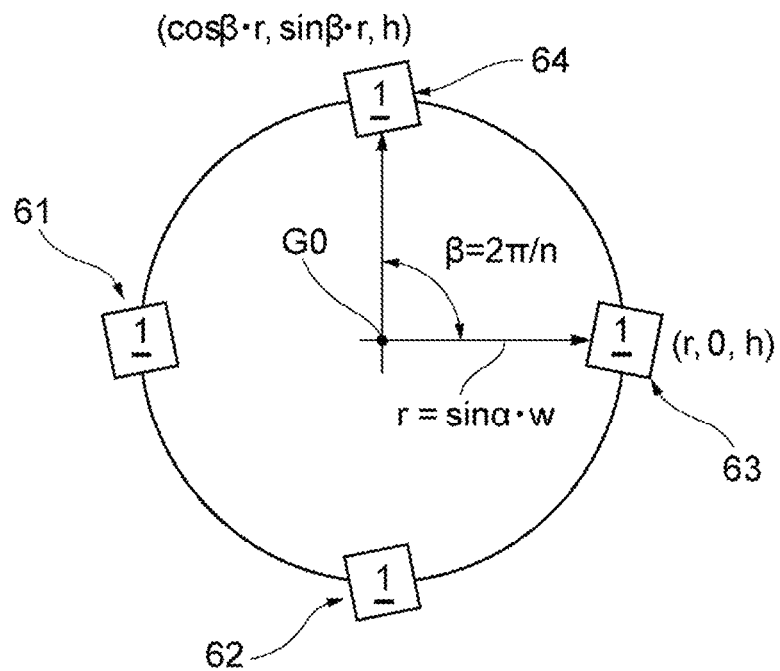
FIG. 7B is a schematic diagram illustrating a top view conceptually showing a method for defining 3D coordinates of a sensor in poses, such as are shown in FIG. 6.

FIG. 7A is a schematic perspective view conceptually showing an example method for defining the 3D coordinates of the sensor 1 in the poses shown in FIG. 6. FIG. 7B is a schematic top view conceptually showing the method for defining the 3D coordinates of the sensor 1 in the poses shown in FIG. 6. In this example, the container 6 as the measurement area has an imaginary upper surface with its center defined as an origin G0 of a coordinate system. The coordinate system may have a substantially fixed parameter of, for example, a distance w between the origin G0 and a center G1 of the sensor 1. The distance w may be, for example, within the range that allows the sensor 1 to operate as intended. Input variable parameters may include, for example, an internal angle α formed by a perpendicular from the origin G0 and an imaginary line that defines the distance w, the distance between the perpendicular from the origin G0 and the center G1 of the sensor 1 (the distance between the centers G1 and G2), and the number n of defined poses of the sensor 1. For the defined poses shown in FIG. 6, for example, a pose 63 is expressed by (x, y, z) coordinates of (r, 0, h), and a pose 64 is expressed by (x, y, z) coordinates of (cos β·r, sin β·r, h) based on the geometric positional relationship between the sensor 1 and the measurement area as shown in FIGS. 7A and 7B, where r=sin α·w, h=cos α·w, and β=2π/n. The orientation of the sensor 1 may also be used as a variable parameter, in addition to the 3D coordinates of the pose of the sensor 1 (the orientation may correspond to the direction toward the origin G0 as the center of the measurement area in the example of FIGS. 6 and 7).

Figure 8:
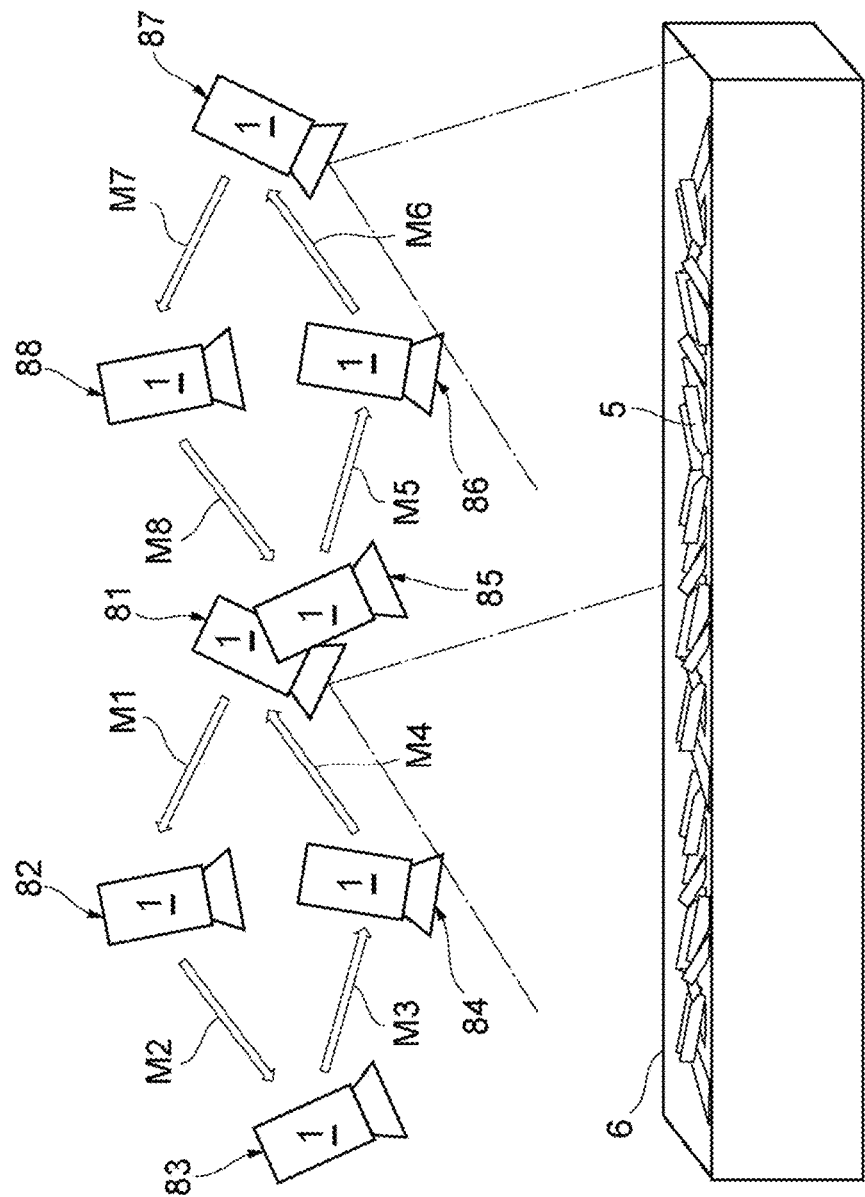
FIG. 8 is a schematic diagram illustrating a perspective view of a measurement device (sensor) in one or more embodiments, showing other example poses and another example measurement path for the measurement device.

FIG. 8 is a schematic perspective view of the sensor 1 in the present embodiment, showing other example poses and another example measurement path for the sensor 1. In this example, different (eight in the drawing) poses 81 to 88 are generated for the sensor 1 having a field of view smaller than the measurement area that includes the workpieces 5 (e.g., the inside of the container 6). As illustrated, the measurement area including the workpieces 5 can be measured from up to eight positions with different orientations and 3D coordinates.

Step S502

In step S502, the path determiner 411 determines a measurement path for the first operating cycle to cause the sensor 1 to move along the measurement path including the generated poses 61 to 64 and to perform 3D measurement of the workpieces 5 in each of the poses 61 to 64. More specifically, for example, unit paths each connecting two adjacent poses may be defined first. The unit paths may then be connected together in an appropriate order into an integrated measurement path.

In the example of FIG. 6, unit paths M1 to M4 each connecting adjacent poses of the poses 61 to 64 of the sensor 1 may be defined. The unit paths M1 to M4 may then be integrated together into a measurement path from M1 through M2 and M3 to M4 to be traveled counterclockwise. In the example of FIG. 8, unit paths M1 to M8 each connecting adjacent poses of the poses 81 to 88 of the sensor 1 may be defined. The unit paths M1 to M8 may then be integrated together into a measurement path from M1 through M2, M3, M4, M5, M6, and M7 to M8 to be traveled counterclockwise. However, the method (strategy) for defining unit paths and measurement paths is not limited to the method (strategy) shown in FIGS. 6 and 8. Nonadjacent poses may be connected. Unit paths may be connected to define a path in any direction or may be connected in any order. The paths may be defined in a random manner.

In step S502, the movement paths P1 and P2 are determined. The movement path P1 refers to a path including the determined measurement path and traveled by the hand 2 when the hand 2 grips and transfers a grip target workpiece 5 from the container 6 to the other container 7. The movement path P2 refers to a path including the determined measurement path and traveled by the hand 2 when the hand 2 returns to the container 6. Step S502 thus corresponds to (2) determining the measurement path for the sensor (first operating cycle) in the above example use.

Step S503

In step S503, the robotic arm controller 403 causes the robotic arm 3 to operate based on the movement path P1 to a grip target workpiece 5 of the workpieces 5 randomly piled in the container 6, and moves the hand 2 to be in the gripping pose to grip a workpiece 5 defined as appropriate. The hand controller 402 then causes the hand 2 to operate based on the gripping pose and grip the grip target workpiece 5. The robotic arm controller 403 and the hand controller 402 cause the grip target workpiece 5 to be picked up from the container 6, moved along the movement path P1 to the other container 7, and released and dropped at a target position to be placed in an aligned manner. Step S503 thus corresponds to (3) gripping, moving, and releasing a workpiece in the above example use.

Step S504

During the process of gripping, moving, and releasing a workpiece 5 in step S503, the sensor controller 401 causes, in step S504, the sensor 1 to operate in the poses defined in the measurement path and measure the workpieces 5 using a set of defaults for measurement conditions. The sensor controller 401 thus obtains measurement data including 3D positional information about the workpiece 5. The 3D measurement of the workpieces 5 may be performed while the hand 2 gripping a workpiece 5 is moving away from the container 6 toward the other container 7 (movement path P1), or while the hand 2 is moving from the other container 7 closer to the container 6 after releasing a workpiece 5 (movement path P2). The measurement conditions include, for example, the exposure time, the illumination intensity, and the measurement positions (e.g., 3D positions or poses, or optical axis orientations, of the sensor 1 relative to the workpieces 5), as well as various other conditions determined with the measurement scheme to be used. The sensor 1 outputs, to the measurement data obtainer 420, measurement data about the workpieces 5, such as 3D point cloud data, range images, or optionally intensity images. Step S504 thus corresponds to (4) 3D measurement of workpieces in the above example use.

Step S505

At an appropriate time before, during, or after 3D measurement of workpieces in step S504, the model data obtainer 421 obtains, in step S505, 3D model data (3D CAD model data) representing the pre-created 3D shape of each workpiece 5 or templates or model patterns usable for 3D matching. The model data obtainer 421 then stores the data, templates, or model patterns into the storage 43. The workpiece pose recognizer 422 extracts feature points indicating the 3D shape of each workpiece 5 from measurement data about the workpiece 5, and performs 3D matching by comparing the extracted feature points with corresponding feature points or a corresponding feature pattern in the 3D model data about the workpiece 5 for a predetermined search area. The workpiece pose recognizer 422 then recognizes the pose of each workpiece 5 using a set of defaults for recognition parameters for recognizing the pose of the workpiece 5. The output data about the pose of each workpiece 5 may include, for example, the 3D coordinates (x, y, z) and the rotational angle (rx, ry, rz) about the 3D axis of the workpiece 5. The workpiece pose recognizer 422 optionally calculates the number of workpieces 5 with their poses detected, and stores the recognition results and the optional calculation results into the storage 43.

The recognition parameters for recognizing the pose of each workpiece 5 may include, for example, a threshold for detecting the workpiece 5 for pose recognition, or more specifically, a threshold for 3D matching between 3D model data and measurement data about the workpiece 5. The workpiece pose recognizer 422 stores the detected results of pose recognition for the workpieces 5 into the storage 43.

The workpiece pose recognizer 422 further evaluates, for example, the reliability (accuracy) of the recognition result of each workpiece 5 with an appropriate method based on the result of pose recognition for the workpiece 5. Based on the evaluation results, for example, workpieces 5 with higher reliability than a predetermined threshold are selected as candidate workpieces 5 to be gripped next by the hand 2. The reliability may be evaluated by, for example, extracting the feature quantity of the 3D shape of each workpiece 5 from the result of pose recognition for the workpiece 5 and calculating an index indicating the degree of agreement with or similarity to 3D model data based on the extracted feature quantity.

The hand gripping pose generator 430 then calculates the gripping poses of the hand 2 to grip the workpieces 5 determined to be the grip target workpieces 5. For this calculation, the hand gripping pose generator 430 uses a set of defaults for calculation parameters for calculating the gripping poses of the hand 2 to grip the workpieces 5, and uses the results of pose recognition for the workpieces 5. The calculation parameters for calculating the gripping poses of the hand 2 to grip the workpieces 5 may include, for example, a threshold for calculating the gripping pose. For example, the hand gripping pose evaluator 431 selects, in a random manner or as appropriate, workpieces 5 from the workpieces 5 grippable with the hand 2. The hand gripping pose evaluator 431 evaluates each selected workpiece 5 to obtain, for example, the easiness of gripping of the workpiece 5 with the hand 2. Based on the evaluation results, the grip workpiece determiner 440 determines the workpiece 5 to be gripped in the next operating cycle. Step S505 thus corresponds to (5) recognizing workpiece poses and (6) determining the next workpiece to be gripped in the above example use.

Step S506

During the process of gripping, moving, and releasing a workpiece in step S503, the measurement path for the sensor 1 and the movement path including the measurement path are defined in step S506 for the next (or subsequent) operating cycle based on the poses of the sensor 1 defined in the process of generating sensor poses in step S501. These paths are defined to also reflect the position of the workpiece 5 to be gripped in the next operating cycle. The measurement path may be the same as the previous measurement path shown in FIG. 6 or 8, or may include the unit paths M1 to M8 connected in an order different from the order for the unit paths M1 to M8 shown in FIG. 6 or 8. Step S506 thus corresponds to (7) determining the measurement path for the sensor (next operating cycle) in the above example use.

Step S507

In response to any workpiece 5 being determined to remain in the container 6 based on the results of pose recognition for the workpieces 5 (Yes in step S507), the processing returns to step S503 and the next (or subsequent) operating cycle (steps S503 to S506) is repeated. In response to no workpiece 5 being determined to remain in the container 6 (No in step S507), the processing for the container 6 is complete.

4. Advantages and Effects

As described above, the control apparatus 4 for the robotic system 100 according to the present embodiment and the control method using the control apparatus 4 define, for the sensor 1, the measurement path including, for example, the poses 61 to 64 and 81 to 88 generated for the sensor 1. The sensor 1 moves along the movement paths P1 and P2 including the measurement path. During the movement, the sensor 1 performs pose recognition by 3D measurement of the workpieces 5 in the defined poses 61 to 64 and 81 to 88, and the measurement path is determined for the next (or subsequent) operating cycle. This allows more reliable recognition of workpieces 5 remaining in the container 6 than, for example, using a sensor 1 fixed relative to the workpieces 5 and measuring the workpieces 5 in the same field of view in every operating cycle. This causes less interruption in, for example, picking up the workpieces 5 from the container 6, and thus increases robustness in measuring the workpieces 5, the work efficiency for manipulating the workpieces 5, and overall throughput.

The poses 61 to 64 and 81 to 88 of the sensor 1 are defined to fully cover the measurement area including the workpieces 5 (e.g., the inside of the container 6 of the workpieces 5) based on the geometric positional relationship between the sensor 1 and the measurement area. The measurement path can thus be defined to cover the measurement area reliably for the next (or subsequent) operating cycle as well. This increases the recognition accuracy for the workpieces 5 and avoids unsuccessful recognition of the workpieces 5. The 3D measurement of the workpieces 5 can be performed on both the movement paths P1 and P2. This allows the measurement path to be defined more flexibly and in more versatile situations for the next (or subsequent) operating cycle.

The flowchart of FIG. 5 shows the procedure for picking up a workpiece 5 from the container 6. The procedure corresponds to (1) generating sensor poses, (2) determining the measurement path for the sensor (first operating cycle), (3) gripping, moving, and releasing a workpiece, (4) 3D measurement of workpieces, (5) recognizing workpiece poses, (6) determining the next workpiece to be gripped, and (7) determining the measurement path for the sensor (next operating cycle) in the above example use.

In the procedure for placing a workpiece 5 into the container 7, the processing may be performed similarly to the flowchart of FIG. 5. In this case, the procedure for placing a workpiece 5 into the container 7 corresponds to (1) generating sensor poses, (2) determining the measurement path for the sensor (first operating cycle), (3) gripping, moving, and releasing a workpiece, (4) 3D measurement of workpieces, (5) recognizing workpiece poses, (6) determining the position at which a next workpiece is to be placed, and (7) determining the measurement path for the sensor (next operating cycle) in the above example use.

However, the procedure for picking up a workpiece 5 from the container 6 is used to recognize the status of the pile of workpieces 5 in the container 6 and their poses to determine the workpiece 5 to be picked up from the container 6. In contrast, the procedure for placing a workpiece 5 into the container 7 is used to recognize the status of the pile of workpieces 5 in the container 7 and their poses to determine the area (position) in or at which the workpiece 5 is to be placed in a vacant area (or in other words, an area with no workpiece 5) in the container 7. Based on this difference, the procedure for placing a workpiece 5 into the container 7 is performed differently from the procedure for picking up a workpiece 5 from the container 6 in one or more of the steps in the flowchart of FIG. 5.

In the procedure for picking up a workpiece 5 from the container 6, for example, 3D measurement of the workpieces 5 in the container 6 is performed in step S504. In the procedure for placing a workpiece 5 into the container 7, 3D measurement of the workpieces 5 in the container 7 is performed in the step corresponding to step S504. The 3D measurement of the workpieces 5 in the container 7 may be performed before a workpiece 5 is placed into the container 7 (or in other words, while the sensor 1 is on the movement path P1) or after a workpiece 5 is placed into the container 7 (or in other words, while the sensor 1 is on the movement path P2). To avoid the collapse of the workpieces 5 piled in the container 7, the 3D measurement of the workpieces 5 may be performed after a workpiece 5 is placed into the container 7.

In the procedure for picking up a workpiece 5 from the container 6, for example, the workpiece 5 to be gripped in the next operating cycle is determined in step S505. In the procedure for placing a workpiece 5 into the container 7, the target position at which the workpiece 5 is to be placed with the hand 2 is determined in the step corresponding to step S505.

In the procedure for picking up a workpiece 5 from the container 6, for example, the determination is performed as to whether a workpiece 5 remains in the container 6 in step S507. In the procedure for placing a workpiece 5 into the container 7, the determination is performed as to whether the container 7 includes an area (target position) at which the workpiece 5 can be placed in the step corresponding to step S507.

5. Modifications

The embodiment of the present disclosure described in detail above is a mere example of the present disclosure in all respects. The embodiment may be variously modified or altered without departing from the scope of the present disclosure. For example, the embodiment may be modified in the forms described below. In the modifications described below, like reference numerals denote like components in the above embodiment. Such components will not be described. The above embodiment and the modifications below may be combined as appropriate.

5.1 First Modification

Figure 9:
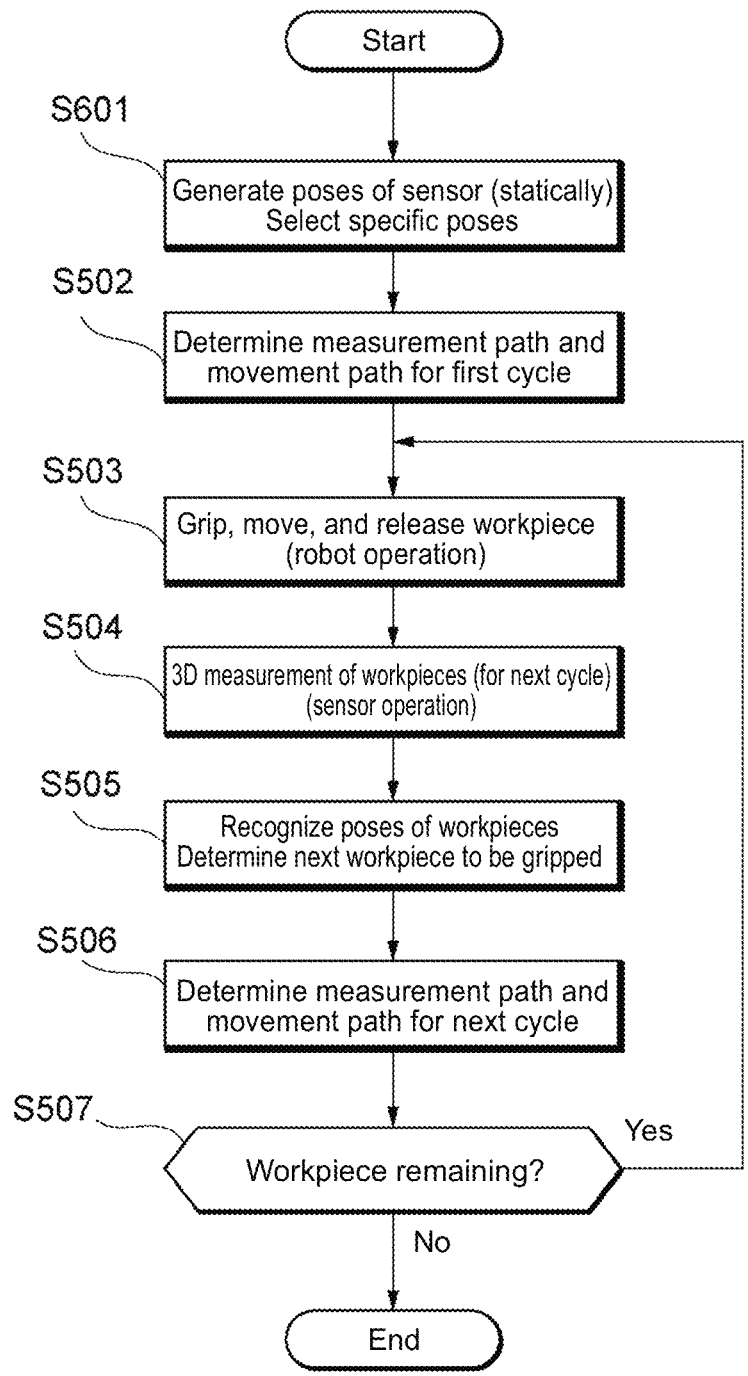
FIG. 9 is a flowchart illustrating an example procedure performed in a robotic system including a control apparatus according to a first modification.

FIG. 9 is a flowchart showing an example procedure performed in a robotic system including a control apparatus according to a first modification. In the first modification as well, the robotic system 100 including the control apparatus 4 according to the embodiment shown in FIGS. 1A to 4 can be used. An example procedure in the first modification is substantially the same as the example procedure in FIG. 5 except for step S601 performed instead of step S501 in the operation example in FIG. 5.

In step S601, similarly to step S501, the sensor pose generator 410 first generates poses of the sensor 1 (orientations and 3D coordinates of the sensor 1) for the sensor 1 to perform 3D measurement of the workpieces 5. In this example, one or more fixed poses of the sensor 1 are statically defined to fully cover the measurement area including the workpieces 5 (e.g., the inside of the container 6 of the workpieces 5) based on the geometric positional relationship between the sensor 1 and the measurement area. The sensor pose generator 410 selects one or more specific poses from the generated poses based on a predetermined condition or a predetermined measurement strategy or in a random manner.

Examples of the predetermined condition include measurement data about workpieces 5 (e.g., point cloud data about recognized workpieces 5 or range images) in a previous operating cycle, the results of pose recognition for workpieces 5 (e.g., the number, placement, or poses of recognized workpieces 5) in a previous operating cycle, the structure of the robotic system 100 (e.g., the geometric positional relationship between the field of view of the sensor 1, the measurement area, and the area in which workpieces 5 are positioned). The predetermined measurement strategy is based on, for example, at least one of the coverage of the measurement area (to cover a wider measurement area), the easiness of recognition of workpieces 5 (to allow easier recognition of workpieces 5), the efficiency of the measurement path (to define, for example, the shortest measurement path), the reliability of recognition of workpieces 5 (for workpieces 5 recognized unsuccessfully or less reliably), or the positions of workpieces 5 in the pile (representing the easiness of gripping of randomly piled workpieces 5). The efficiency of the measurement path is an index value indicating the level of efficiency with which 3D measurement of the workpieces 5 can be performed. For example, a measurement path that takes a shorter time for 3D measurement of the workpieces 5 has higher efficiency.

With the above structure, the poses 61 to 64 and 81 to 88 of the sensor 1 are statically defined to fully cover the measurement area. From these poses, specific poses that may allow more reliable recognition of the workpieces 5 can be selected for the next operating cycle based on, for example, the poses of recognized workpieces 5. The poses of the sensor 1 can thus be defined dynamically to define the measurement path for the next operating cycle. This further increases robustness in measuring the workpieces 5, measurement efficiency, and the work efficiency for manipulating the workpieces 5.

FIGS. 10A to 10D are top views conceptually showing the predetermined measurement strategy. FIG. 10E is a cross-sectional side view conceptually showing the predetermined measurement strategy. In each figure, the portion shown on the left (hereafter, the left portion) shows a measurement area (the inside of the container 6) including the workpieces 5 (5*a*, 5*b*) measured in the previous operating cycle in a measurement field of view V1 corresponding to a pose of the sensor 1 in the previous operating cycle. In each figure, the portion shown on the right (hereafter, the right portion) shows a measurement area (the inside of the container 6) including the workpieces 5 (5*b*) to be measured in the next operating cycle in a measurement field of view V2 corresponding to a pose of the sensor 1 in the next operating cycle.

Figure 10:
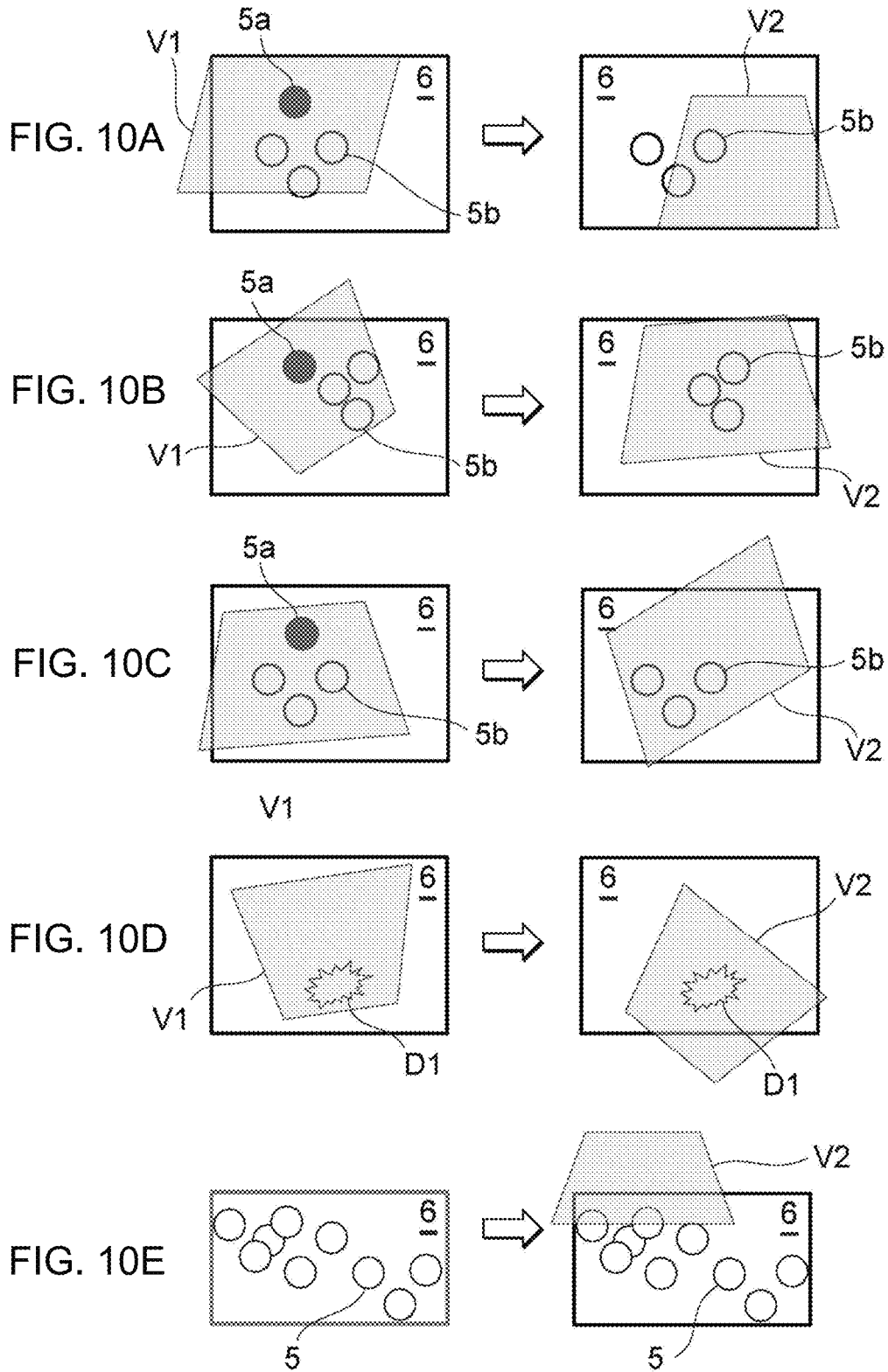
FIGS. 10A to 10D are diagrams illustrating top views conceptually showing a predetermined measurement strategy.
FIG. 10E is a diagram illustrating a cross-sectional side view conceptually showing a predetermined measurement strategy.

FIG. 10A shows an example measurement strategy based on the coverage of the measurement area. Under this strategy, the workpiece 5*a* (solid circle) is gripped among the four workpieces 5 recognized in the measurement field of view V1 in the left portion. The measurement path is determined to cause the measurement field of view V2 in the right portion to cover a wider measurement area including the remaining three workpieces 5*b* (outlined circles) for the next operating cycle. This strategy allows a wider coverage of the measurement area and thus easily avoids unsuccessful measurement or unsuccessful recognition of the workpieces 5.

FIG. 10B shows an example measurement strategy based on the easiness of recognition of the workpieces 5. Under this strategy, the workpiece 5*a* is gripped among the four workpieces 5 recognized in the measurement field of view V1 in the left portion. The measurement path is determined to cause the measurement field of view V2 in the right portion to have the center aligned with, for example, the center of gravity of the remaining three workpieces 5*b* for the next operating cycle. This strategy allows more reliable and easier recognition of the workpieces 5 and thus increases the reliability of the pose recognition for the remaining workpieces 5*b*.

FIG. 10C shows an example measurement strategy based on the easiness of change of the measurement path. Under this strategy, the workpiece 5*a* is gripped among the four workpieces 5 recognized in the measurement field of view V1 in the left portion. The measurement path is determined to allow the remaining three workpieces 5*b* to be measured again with the measurement field of view V2 with a minimum movement distance for the next operating cycle. This strategy allows more reliable pose recognition for the remaining workpieces 5*b* and also increases measurement efficiency.

FIG. 10D shows an example measurement strategy based on the reliability of recognition of the workpieces 5. The workpieces 5 are recognized unsuccessfully or less reliably in the measurement field of view V1 in the left portion. In this case, the measurement data (geometric positional information) about the measurement area (the container 6) with no workpiece is the background data and is subtracted from the measurement data (point cloud data) in the left portion to detect point cloud data D1 about the workpieces 5 that are expected to be positioned in the measurement area. The measurement path is determined to include a different measurement field of view V2 that includes the position corresponding to the point cloud data D1 as shown in the right portion. This can effectively increase the likelihood of recognition of the workpieces 5.

FIG. 10E shows an example measurement strategy based on the position of the workpiece 5 in the pile (easiness of grip). For workpieces 5 randomly piled in the container 6 as shown in the left portion, the measurement path is determined to cause the measurement field of view V2 to include workpieces 5 at the top of the randomly piled workpieces 5. This can effectively increase the likelihood of successful gripping of a workpiece 5.

The measurement strategies for successfully gripping a workpiece 5 from the container 6 have been described above with reference to FIGS. 9 and 10A to 10E. The strategies can be similarly used for successfully placing a workpiece 5 into the container 7. For example, the easiness of gripping of the workpiece 5 and the easiness of recognition of the workpiece 5 for successfully gripping the workpiece 5 from the container 6 may be replaced with the easiness of placement of the workpiece 5 and the easiness of recognition of the position at which the workpiece 5 is to be placed for successfully placing the workpiece 5 into the container 7. This allows selection of the optimum measurement strategy to determine the area (target position) in a vacant area in the container 7 in which the workpiece 5 is to be placed without interfering with the workpieces 5 in the container 7.

5.2 Second Modification

Figure 11:
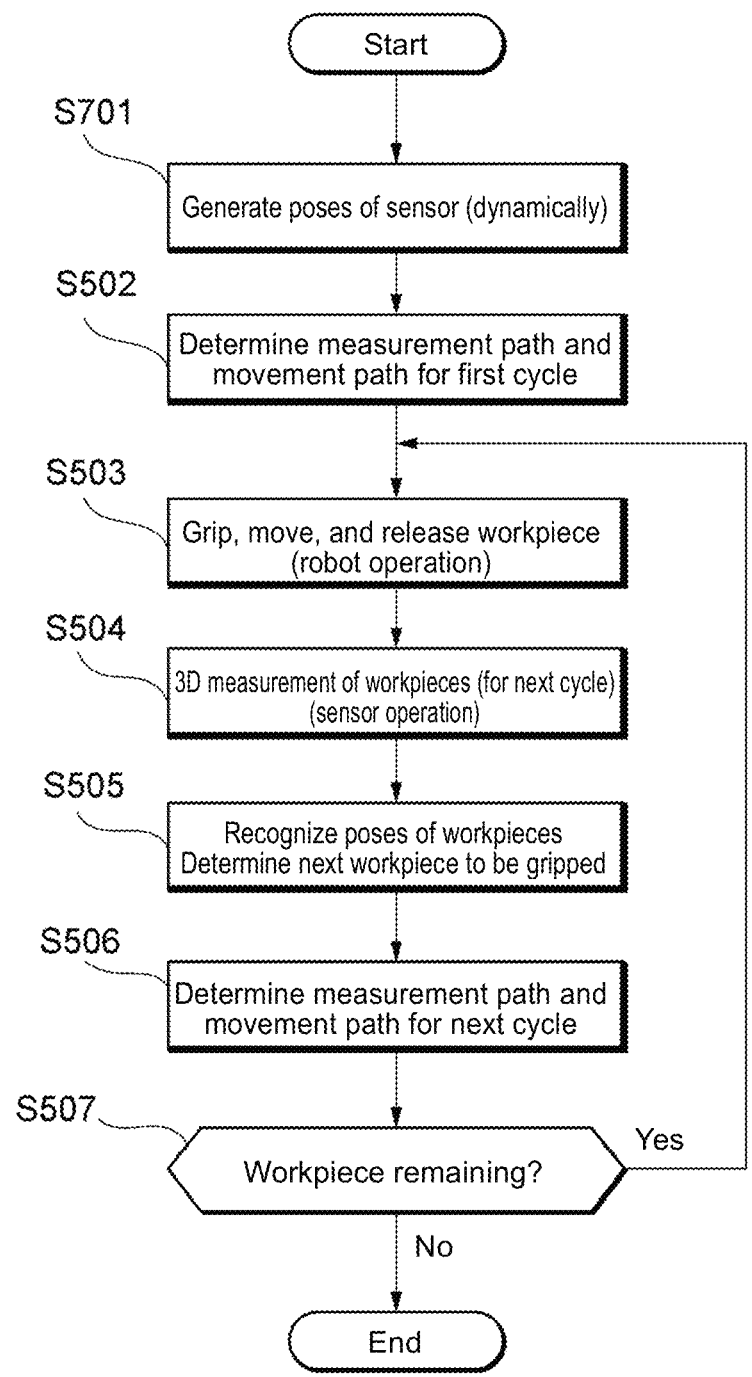
FIG. 11 is a flowchart illustrating an example procedure performed in a robotic system including a control apparatus according to a second modification.

FIG. 11 is a flowchart showing an example procedure performed in a robotic system including a control apparatus according to a second modification. In the second modification as well, the robotic system 100 including the control apparatus 4 according to the embodiment shown in FIGS. 1A to 4 can be used. An example procedure in the second modification is substantially the same as the example procedure in FIG. 5 except for step S701 performed instead of step S501 in the operation example in FIG. 5.

In step S701, the sensor pose generator 410 generates poses of the sensor 1 (orientations and 3D coordinates of the sensor 1) to perform 3D measurement of the workpieces 5. The sensor pose generator 410 dynamically defines one or more poses of the sensor 1 based on a predetermined condition or a predetermined measurement strategy or in a random manner. The predetermined condition and the predetermined measurement strategy may be equivalent to those in the first modification.

This structure can more dynamically define the poses of the sensor 1 that may allow more reliable recognition of workpieces 5 for the next operating cycle based on, for example, the poses of recognized workpieces 5 without predefining the fixed poses of the sensor 1. The dynamically defined poses can be used to define the measurement path for the next operating cycle. This further increases robustness in measuring the workpieces 5, measurement efficiency, and the work efficiency for manipulating the workpieces 5.

6. Appendixes

The above embodiment and modifications intend to facilitate understanding of the present invention and do not limit the present invention. The elements in the embodiment and the modifications and their positions, materials, conditions, shapes, sizes, or other parameters are not limited to those illustrated above but may be changed as appropriate. The components in different embodiments or modifications may be partly combined or interchanged. The above embodiment may be partly or entirely expressed in, but not limited to, the following forms.

Appendix 1

A control apparatus for a robotic system, the robotic system including a robot and a measurement device, the robot including a robotic arm and a hand at an end of the robotic arm to manipulate an object, the measurement device being located on the robotic arm to measure positional information about the object, the apparatus comprising:

a pose generator configured to generate one or more poses of the measurement device to measure the positional information about the object; a measurement path determiner configured to determine, for the measurement device, a measurement path including at least one pose of the one or more poses to cause the measurement device to move along the measurement path including the at least one pose and to measure the positional information about the object in the at least one pose;

an instructor configured to instruct the robot to move the measurement device along a movement path including the measurement path, and to instruct the measurement device to measure the positional information about the object in the at least one pose included in the measurement path; and a recognizer configured to perform recognition of the object using measurement data obtained by the measurement device, wherein the measurement path determiner determines the measurement path for the measurement device for a next operating cycle.

Appendix 2

The control apparatus according to appendix 1, wherein the pose generator pre-generates, based on a geometric positional relationship between the measurement device and a measurement area including the object, the one or more poses to fully cover the measurement area, and the measurement path determiner determines the measurement path including the one or more poses to cause the measurement device to move along the measurement path including the one or more poses in a predetermined order.

Appendix 3

The control apparatus according to appendix 1, wherein the pose generator pre-generates the one or more poses based on a measurement result obtained by the measurement device in an operating cycle being at least one cycle preceding a current operating cycle, and the measurement path determiner determines the measurement path including the one or more poses to cause the measurement device to move along the measurement path including the one or more poses in a predetermined order.

Appendix 4

The control apparatus according to appendix 3, wherein the measurement result includes measurement data about the object obtained by the measurement device or a result of the recognition of the object.

Appendix 5

The control apparatus according to appendix 4, wherein the measurement data or the result of recognition includes at least one of the result of recognition of the object with lower reliability, point cloud data about the object being unsuccessfully recognized, missing data, a discrete shape, or data about the object at a higher position.

Appendix 6

The control apparatus according to any one of appendixes 2 to 5, wherein the pose generator selects one or more specific poses from the one or more poses based on a predetermined condition or a predetermined measurement strategy or in a random manner, and the measurement path determiner determines, based on a predetermined condition or a predetermined measurement strategy or in a random manner, the measurement path including at least one pose of the one or more specific poses to cause the measurement device to move along the measurement path including the at least one pose of the one or more specific poses in a predetermined order.

Appendix 7

The control apparatus according to any one of appendixes 1 to 5, wherein the pose generator generates the one or more poses based on a predetermined condition or a predetermined measurement strategy or in a random manner, and the measurement path determiner determines, based on a predetermined condition or a predetermined measurement strategy or in a random manner, the measurement path including the at least one pose of the one or more poses to cause the measurement device to move along the measurement path including the at least one pose in a predetermined order.

Appendix 8

The control apparatus according to appendix 6 or appendix 7, wherein the predetermined condition includes at least one of measurement data about the object in a previous operating cycle, a result of the recognition of the object in a previous operating cycle, or a structure of the robotic system.

Appendix 9

The control apparatus according to any one of appendixes 6 to 8, wherein the predetermined measurement strategy is based on at least one of a coverage of the measurement area, easiness of the recognition of the object, efficiency of the measurement path, reliability of the recognition of the object, or a position of the object.

Appendix 10

The control apparatus according to any one of appendixes 1 to 9, wherein the instructor instructs the measurement device to measure the positional information about the object in the one or more poses in movement of the hand gripping the object and/or in movement of the hand to grip the object in one operating cycle.

Appendix 11

A control method for a robotic system, the robotic system and a measurement device, the robot including a robotic arm and a hand at an end of the robotic arm to manipulate an object, the measurement device being located on the robotic arm to measure positional information about the object, the method comprising:
  generating, with a pose generator, one or more poses of the measurement device to measure the positional information about the object;
  determining, with a measurement path determiner, for the measurement device, a measurement path including the one or more poses to cause the measurement device to move along the measurement path including the one or more poses and to measure the positional information about the object in the one or more poses;
  instructing, with an instructor, the robot to move the measurement device along a movement path including the measurement path, and instructing the measurement deviceto measure the positional information about the object in at least one pose of the one or more poses included in the measurement path;
  performing, with a recognizer, recognition of the object using measurement data obtained by the measurement device; and
  determining, with the measurement path determiner, the measurement path for the measurement device for a next operating cycle during movement of the measurement device along the movement path.

Appendix 12

A computer control program for causing a computer to function as a control apparatus for a robotic system, the robotic system and a measurement device, the robot including a robotic arm and a hand at an end of the robotic arm to manipulate an object, the measurement device being located on the robotic arm to measure positional information about the object, the control apparatus including
  a pose generator configured to generate one or more poses of the measurement device to measure the positional information about the object,
  a measurement path determiner configured to determine, for the measurement device, a measurement path including the one or more poses to cause the measurement device to move along the measurement path including the one or more poses and to measure the positional information about the object in the one or more poses,
  an instructor configured to instruct the robot to move the measurement device along a movement path including the measurement path, and to instruct the measurement device to measure the positional information about the object in at least one pose of the one or more poses included in the measurement path, and
  a recognizer configured to perform recognition of the object using measurement data obtained by the measurement device,
  wherein the measurement path determiner determines the measurement path for the measurement device for a next operating cycle during movement of the measurement device along the movement path.

Appendix 13

A robotic system, comprising:
  a robot including a robotic arm and a hand at an end of the robotic arm to manipulate an object;
  a measurement device located on the robotic arm to measure positional information about the object; and
  a control apparatus connected to the robot and the measurement device, the control apparatus including
  a pose generator configured to generate one or more poses of the measurement device to measure the positional information about the object,
  a measurement path determiner configured to determine, for the measurement device, a measurement path including at least one pose of the one or more poses to cause the measurement device to move along the measurement path including the at least one pose and to measure the positional information about the object in the at least one pose,
  an instructor configured to instruct the robot to move the measurement device along a movement path including the measurement path, and to instruct the measurement device to measure the positional information about the object in the at least one pose included in the measurement path, and
  a recognizer configured to perform recognition of the object using measurement data obtained by the measurement device,
  wherein the measurement path determiner determines the measurement path for the measurement device for a next operating cycle during movement of the measurement device along the movement path.

REFERENCE SIGNS LIST 1 sensor (measurement device)
2 hand
3 robotic arm
4 control apparatus
5, 5a, 5b workpiece
6, 7 container
10 robot
41 control arithmetic unit
42 communication I/F
42 communication interface (I/F)
43 storage
44 input unit
45 output unit
46 bus line
61 to 64, 81 to 88 pose
100 robotic system
401 sensor controller
402 hand controller
403 robotic arm controller
410 sensor pose generator
411 path determiner
420 measurement data obtainer 421 model data obtainer
422 workpiece pose recognizer
430 hand gripping pose generator
431 hand gripping pose evaluator
440 grip workpiece determiner
D1 point cloud data
M1 to M8 unit path
P1, P2 movement path
V1, V2 measurement field of view

The invention claimed is:

1. A control apparatus for a robotic system, the robotic system comprising a robot and a measurement device, the robot comprising a robotic arm and a hand at an end of the robotic arm to manipulate an object, the measurement device being located on the robotic arm to measure positional information about the object, the apparatus comprising a processor configured with a program to perform operations comprising:
    operation as a pose generator configured to generate one or more poses of the measurement device to measure the positional information about the object;
    operation as a measurement path determiner configured to determine, for the measurement device, a measurement path comprising at least one pose of the one or more poses to cause the measurement device to move along the measurement path comprising the at least one pose and to measure the positional information about the object in the at least one pose;
    operation as an instructor configured to instruct the robot to move the measurement device along a movement path comprising the measurement path, and to instruct the measurement device to measure the positional information about the object in the at least one pose comprised in the measurement path; and
    operation as a recognizer configured to perform recognition of the object using measurement data obtained by the measurement device,
    wherein such that operation as the measurement path determiner determines the measurement path for the measurement device for a next operating cycle.

2. The control apparatus according to claim 1, wherein the processor is configured with the program to perform operations such that:
    operation as the pose generator comprises pre-generating, based on a geometric positional relationship between the measurement device and a measurement area comprising the object, the one or more poses to fully cover the measurement area; and
    operation as the measurement path determiner comprises determining the measurement path comprising the one or more poses to cause the measurement device to move along the measurement path comprising the one or more poses in a predetermined order.

3. The control apparatus according to claim 2, wherein the processor is configured with the program to perform operations such that:
    operation as the pose generator comprises selecting one or more specific poses from the one or more poses based on a predetermined condition or a predetermined measurement strategy or in a random manner; and
    operation as the measurement path determiner comprises determining, based on a predetermined condition or a predetermined measurement strategy or in a random manner, the measurement path comprising at least one pose of the one or more specific poses to cause the measurement device to move along the measurement path comprising the at least one pose of the one or more specific poses in a predetermined order.

4. The control apparatus according to claim 3, wherein the predetermined condition comprises at least one of measurement data about the object in a previous operating cycle, a result of the recognition of the object in a previous operating cycle, or a structure of the robotic system.

5. The control apparatus according to claim 3, wherein the predetermined measurement strategy is based on at least one of a coverage of the measurement area, easiness of the recognition of the object, efficiency of the measurement path, reliability of the recognition of the object, or a position of the object.

6. The control apparatus according to claim 2, wherein the processor is configured with the program to perform operations such that:
    operation as the pose generator generates the one or more poses based on a predetermined condition or a predetermined measurement strategy or in a random manner; and
    operation as the measurement path determiner determines, based on a predetermined condition or a predetermined measurement strategy or in a random manner, the measurement path comprising the at least one pose of the one or more poses to cause the measurement device to move along the measurement path comprising the at least one pose in a predetermined order.

7. The control apparatus according to claim 1, wherein the processor is configured with the program to perform operations such that:
    operation as the pose generator comprises pre-generating the one or more poses based on a measurement result obtained by the measurement device in an operating cycle being at least one cycle preceding a current operating cycle; and
    operation as the measurement path determiner comprises determining the measurement path comprising the one or more poses to cause the measurement device to move along the measurement path comprising the one or more poses in a predetermined order.

8. The control apparatus according to claim 7, wherein the measurement result comprises measurement data about the object obtained by the measurement device or a result of the recognition of the object.

9. The control apparatus according to claim 8, wherein the measurement data or the result of recognition comprises at least one of the result of recognition of the object with lower reliability, point cloud data about the object being unsuccessfully recognized, missing data, a discrete shape, or data about the object at a higher position.

10. The control apparatus according to claim 9, wherein the processor is configured with the program to perform operations such that:
    operation as the pose generator selects one or more specific poses from the one or more poses based on a predetermined condition or a predetermined measurement strategy or in a random manner; and
    operation as the measurement path determiner determines, based on a predetermined condition or a predetermined measurement strategy or in a random manner, the measurement path comprising at least one pose of the one or more specific poses to cause the measurement device to move along the measurement path comprising the at least one pose of the one or more specific poses in a predetermined order.

11. The control apparatus according to claim 8, wherein the processor is configured with the program to perform operations such that:
- operation as the pose generator selects one or more specific poses from the one or more poses based on a predetermined condition or a predetermined measurement strategy or in a random manner; and
- operation as the measurement path determiner determines, based on a predetermined condition or a predetermined measurement strategy or in a random manner, the measurement path comprising at least one pose of the one or more specific poses to cause the measurement device to move along the measurement path comprising the at least one pose of the one or more specific poses in a predetermined order.

12. The control apparatus according to claim 7, wherein the processor is configured with the program to perform operations such that:
- operation as the pose generator comprises selecting one or more specific poses from the one or more poses based on a predetermined condition or a predetermined measurement strategy or in a random manner; and
- operation as the measurement path determiner determines, based on a predetermined condition or a predetermined measurement strategy or in a random manner, the measurement path comprising at least one pose of the one or more specific poses to cause the measurement device to move along the measurement path comprising the at least one pose of the one or more specific poses in a predetermined order.

13. The control apparatus according to claim 7, wherein the processor is configured with the program to perform operations such that:
- operation as the pose generator generates the one or more poses based on a predetermined condition or a predetermined measurement strategy or in a random manner; and
- operation as the measurement path determiner determines, based on a predetermined condition or a predetermined measurement strategy or in a random manner, the measurement path comprising the at least one pose of the one or more poses to cause the measurement device to move along the measurement path comprising the at least one pose in a predetermined order.

14. The control apparatus according to claim 1, wherein the processor is configured with the program to perform operations such that:
- operation as the pose generator comprises generating the one or more poses based on a predetermined condition or a predetermined measurement strategy or in a random manner; and
- operation as the measurement path determiner comprises determining, based on a predetermined condition or a predetermined measurement strategy or in a random manner, the measurement path comprising the at least one pose of the one or more poses to cause the measurement device to move along the measurement path comprising the at least one pose in a predetermined order.

15. The control apparatus according to claim 1, wherein the processor is configured with the program to perform operations such that operation as the instructor comprises instructing the measurement device to measure the positional information about the object in the one or more poses in movement of the hand gripping the object and/or in movement of the hand to grip the object in one operating cycle.

16. The control apparatus according to claim 1, the processor is configured with the program to perform operations further comprising:
- operation as a determiner configured to determine an object to be gripped with the hand based on the positional information about the object.

17. The control apparatus according to claim 1, the processor is configured with the program to perform operations further comprising:
- operation as a determiner configured to determine a target position at which an object is to be placed with the hand based on the positional information about the object.

18. A control method for a robotic system, the robotic system comprising a robot and a measurement device, the robot comprising a robotic arm and a hand at an end of the robotic arm to manipulate an object, the measurement device being located on the robotic arm to measure positional information about the object, the method comprising:
- generating, with a pose generator, one or more poses of the measurement device to measure the positional information about the object;
- determining, with a measurement path determiner, for the measurement device, a measurement path comprising the one or more poses to cause the measurement device to move along the measurement path comprising the one or more poses and to measure the positional information about the object in the one or more poses;
- instructing, with an instructor, the robot to move the measurement device along a movement path comprising the measurement path, and instructing the measurement device to measure the positional information about the object in at least one pose of the one or more poses comprised in the measurement path;
- performing, with a recognizer, recognition of the object using measurement data obtained by the measurement device; and
- determining, with the measurement path determiner, the measurement path for the measurement device for a next operating cycle.

19. A non-transitory computer-readable storage medium storing a computer control program, which when read and executed, causes a computer to perform as a control apparatus for a robotic system, the robotic system comprising a robot and a measurement device, the robot comprising a robotic arm and a hand at an end of the robotic arm to manipulate an object, the measurement device being located on the robotic arm to measure positional information about the object, the computer control program causing the computer to perform as the control apparatus by performing operations comprising:
- operation as a pose generator configured to generate one or more poses of the measurement device to measure the positional information about the object,
- operation as a measurement path determiner configured to determine, for the measurement device, a measurement path comprising the one or more poses to cause the measurement device to move along the measurement path comprising the one or more poses and to measure the positional information about the object in the one or more poses,
- operation as an instructor configured to instruct the robot to move the measurement device along a movement path comprising the measurement path, and instructing the measurement device to measure the positional information about the object in at least one pose of the one or more poses comprised in the measurement path, and operation as a recognizer configured to perform recognition of the object using measurement data obtained by the measurement device, wherein such that operation as the measurement path determiner determines the measurement path for the measurement device for a next operating cycle.

20. A robotic system, comprising:

a robot comprising a robotic arm and a hand at an end of the robotic arm to manipulate an object;

a measurement device located on the robotic arm to measure positional information about the object; and the control apparatus according to claim 1.

\* \* \* \* \*

UNITED STATES PATENT AND TRADEMARK OFFICE
CERTIFICATE OF CORRECTION

Page 1 of 1

PATENT NO. : 12,097,627 B2
APPLICATION NO. : 17/788772
DATED : September 24, 2024
INVENTOR(S) : Xingdou Fu, Lin Miao and Yasuhiro Ohnishi It is certified that error appears in the above-identified patent and that said Letters Patent is hereby corrected as shown below:

In the Claims

Claim 1, Column 25, starting from Line 39 should be changed as follows:
wherein the processor is configured with the program such that operation as the measurement path determiner determines the measurement path for the measurement device for a next operating cycle.

Signed and Sealed this
Twenty-sixth Day of November, 2024

Katherine Kelly Vidal
*Director of the United States Patent and Trademark Office*